United States Patent
Trainin et al.

(10) Patent No.: US 11,703,582 B2
(45) Date of Patent: Jul. 18, 2023

(54) MULTISTATIC RADAR MEASUREMENT

(71) Applicant: QUALCOMM Incorporated, San Diego, CA (US)

(72) Inventors: Solomon Trainin, Haifa (IL); Assaf Kasher, Haifa (IL); Alecsander Eitan, Haifa (IL); Ariel Sagi, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/111,386

(22) Filed: Dec. 3, 2020

(65) Prior Publication Data

US 2021/0173065 A1 Jun. 10, 2021

Related U.S. Application Data

(60) Provisional application No. 62/944,900, filed on Dec. 6, 2019.

(51) Int. Cl.
*G01S 13/00* (2006.01)
*G01S 13/32* (2006.01)

(52) U.S. Cl.
CPC .......... *G01S 13/003* (2013.01); *G01S 13/325* (2013.01)

(58) Field of Classification Search
None
See application file for complete search history.

(56) References Cited

U.S. PATENT DOCUMENTS

| | | |
|---|---|---|
| 2008/0170559 A1 | 7/2008 | Zumsteg |
| 2019/0293781 A1 | 9/2019 | Bolin et al. |
| 2019/0317203 A1 | 10/2019 | Rosson |

FOREIGN PATENT DOCUMENTS

JP 2018105770 A 7/2018

OTHER PUBLICATIONS

International Search Report and Written Opinion—PCT/US2020/063220—ISA/EPO—dated Mar. 16, 2021.
Kasher A., et al., (QUALCOMM): "WLAN-Based-Radars-in-The-60GHz-Band", IEEE Draft, 11-19-1854-00-SENS-WLAN-Based-Radars-in-The-60GHZ-Band, IEEE-SA Mentor, Piscataway, NJ USA, vol. 802.11 SENS Nov. 11, 2019 (Nov. 11, 2019), XP068164422, pp. 1-14, Retrieved from the Internet:URL:https://mentor.ieee.org/802.11/dcn/19/11-19-1854-00-SENS-wlan-based-radars-in-the-60ghz-band.pptx [retrieved on Nov. 11, 2019] slides 1-3, 8, 10, 11.

*Primary Examiner* — Whitney Moore
(74) *Attorney, Agent, or Firm* — Arun Swain; Holland & Hart LLP

(57) ABSTRACT

This disclosure provides systems, methods and apparatus, including computer programs encoded on computer storage media, for multistatic radar communications. In some implementations, a transmitting device may transmit, to a receiving device, a radar alert frame followed by a codeword and one or more radar pulses. The radar pulses are transmitted, using beamforming, in a number of directions. The timing information indicates a timing offset or delay between one or more codewords of the codeword sequence and the beginning of the radar pulses. The receiving device may detect one or more codewords of the codeword sequence and an echo of at least one of the radar pulses, and determine the time at which the corresponding pulse was transmitted by the transmitting device. The receiving device may compare the timing of the echo with the timing of the transmitted pulse to determine a relative distance of an object that produced the echo.

30 Claims, 16 Drawing Sheets

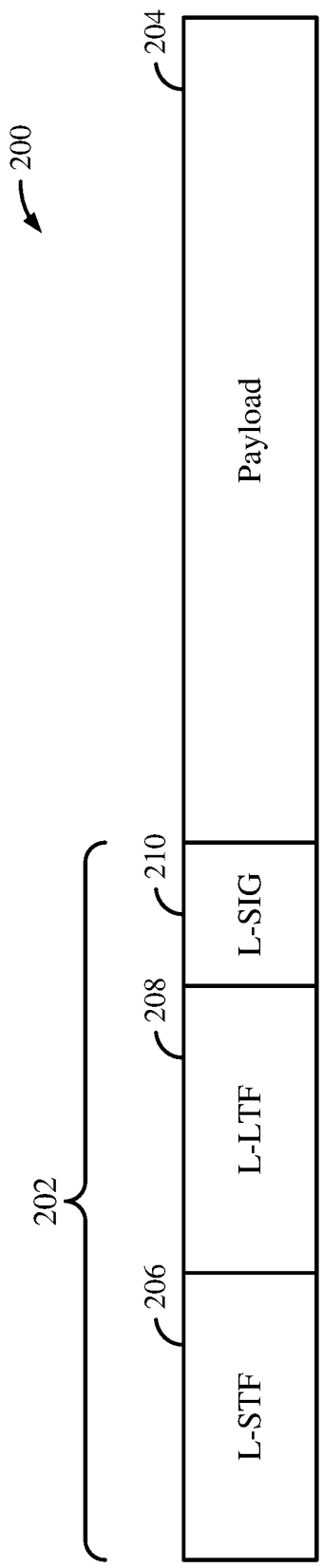
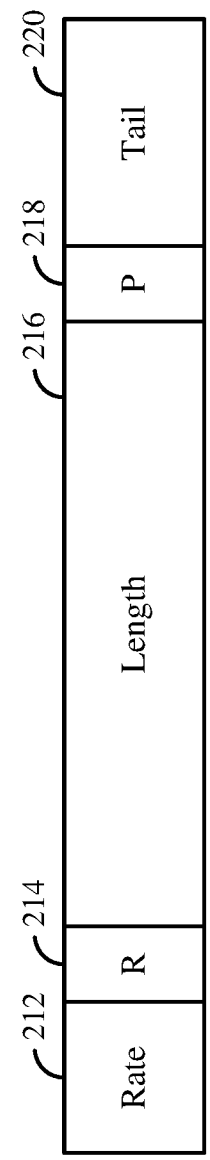
*Figure 2A*
*Figure 2B*

1110 ↘

Determining, based on the feedback, a time at which an echo of a first pulse of the one or more pulses is detected by the first receiving device. (1111)

Determining an angle of departure of the first pulse at the wireless communication device. (1112)

Calculating the distance of the object based at least in part on the angle of departure, the time at which the echo is detected by the first receiving device, and a time at which the first pulse is transmitted by the wireless communication device. (1113)

Transmitting a second radar frame carrying the timing information to a second receiving device. (1121)

Transmitting a second codeword of the codeword sequence, using beamforming, in a direction of the second receiving device. (1122)

Receiving feedback from the second receiving device responsive to the transmission of the one or more pulses. (1123)

Determining, based on the feedback received from the first receiving device, a time at which an echo of a first pulse of the one or more pulses is detected by the first receiving device. (1131)

Determining, based on the feedback received from the second receiving device, a time at which an echo of a second pulse of the one or more pulses is detected by the second receiving device, where the distance of the object is determined based on the time at which the echo of the first pulse is detected by the first receiving device and the time at which the echo of the second pulse is detected by the second receiving device. (1132)

*Figure 11D*

MULTISTATIC RADAR MEASUREMENT

CROSS-REFERENCE TO RELATED APPLICATIONS

This patent application claims priority to U.S. Provisional Patent Application No. 62/944,900 entitled "MULTISTATIC RADAR MEASUREMENT" and filed on Dec. 6, 2019, which is assigned to the assignee hereof. The disclosure of the prior application is considered part of and are incorporated by reference in this patent application.

TECHNICAL FIELD

This disclosure relates generally to wireless communication, and more specifically, to multistatic radar measurements in wireless communication systems.

DESCRIPTION OF THE RELATED TECHNOLOGY

Radar is a ranging technique that can be used to determine the distances of objects relative to a given location. A radar system operates by transmitting and receiving electromagnetic pulses. Some of the pulses reflect off objects or surfaces along the transmission path, producing "echoes." The radar system may determine the distances of the objects or surfaces based on a round trip time between the transmission of a pulse to the reception of an echo of that pulse. In a monostatic radar system, the antennas used to transmit the pulses ("transmit antennas") are collocated with the antennas used to receive the echoes ("receive antennas"). For example, the transmit antennas and receive antennas are often disposed on the same device. This allows for simple synchronization between the timing of the transmitted pulses and the timing of the received echoes since the same device (or system) clock may be used for both.

In a multistatic radar system, the transmit antennas are located a substantial distance away from the receive antennas. The spatial diversity afforded by multistatic systems provides a high accuracy of target location and allows different aspects of a target to be viewed simultaneously. However, to achieve the necessary amount of separation between the transmit antennas and receive antennas, many multistatic radar systems are implemented using multiple devices with no wired communication between them. For example, the transmit antennas may be disposed on a transmit device and the receive antennas may be disposed on one or more spatially diverse receive devices (with a shared or partially shared coverage area). The transmit device may transmit pulses in various directions and the receive devices may detect the resulting echoes. The transmit and receive devices use separate clocks for the timing of pulse transmissions and echo detection. Accordingly, a mechanism is needed to synchronize the transmission of pulses by the transmit device with the reception of echoes by receive devices and to exchange radar measurement information between the transmit and receive devices.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a radar alert frame carrying timing information indicating a timing relationship between a codeword sequence and one or more pulses; detecting a codeword of the codeword sequence; determining a first time at which the codeword is detected; detecting an echo of a pulse of the one or more pulses; determining a second time at which the echo is detected; and determining a distance of an object to the wireless communication device based at least in part on the first time, the second time, and the timing information.

In some implementations, the radar alert frame may be a clear-to-send (CTS)-to-self frame having a control trailer that carries the timing information. In some implementations, each codeword of the codeword sequence may include a respective Golay sequence. In some implementations, the detecting of the codeword may include tuning a plurality of antennas of the wireless communication device in a direction of a transmitting device. In some implementations, the one or more pulses may include a sequence of pulses and the timing information may indicate a duration of each of the one or more pulses and a delay between the detected codeword and the beginning of the sequence of pulses. In some implementations, the detecting of the echo may include positioning a plurality of antennas of the wireless communication device in a plurality of directions.

In some implementations, the method may further include calculating a time at which the pulse is transmitted based on the first time, the second time, and the timing information; and estimating a range of distances associated with the object based at least in part on the second time and the calculated time. In some implementations, the determining of the distance of the object may include determining an angle of arrival of the echo at the wireless communication device; and calculating the distance of the object based at least in part on the angle of arrival and the estimated range of distances. In some implementations, the method may further include transmitting feedback to a transmitting device responsive to detecting the echo, where the feedback indicates the estimated range of distances. In some other implementations, the method may further include transmitting feedback to a transmitting device responsive to detecting the echo, where the feedback indicates the second time.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a radar alert frame carrying timing information indicating a timing relationship between a codeword sequence and one or more pulses; detecting a codeword of the codeword sequence; determining a first time at which the codeword is detected; detecting an echo of a pulse of the one or more pulses; determining a second time at which the echo is detected; and determining a distance of an object to the wireless communication device based at least in part on the first time, the second time, and the timing information.

Another innovative aspect of the subject matter described in this disclosure can be implemented as a method of wireless communication. The method may be performed by a wireless communication device, and may include transmitting, to a first receiving device, a first radar alert frame carrying timing information indicating a timing relationship between a codeword sequence and one or more pulses; transmitting a first codeword of the codeword sequence, using beamforming, in a direction of the first receiving device; transmitting the one or more pulses, using beamforming, in a plurality of directions; receiving feedback from the first receiving device responsive to the transmission of the one or more pulses; and determining a distance of an object to the wireless communication device based at least in part on the feedback received from the first receiving device.

In some implementations, each codeword of the codeword sequence may include a respective Golay sequence. In some implementations, the first radar alert frame may be a CTS-to-self frame having a control trailer that carries the timing information. In some implementations, the CTS-to-self frame may be transmitted, using beamforming, in a direction of the first receiving device. In some implementations, the codeword sequence and the one or more pulses may be transmitted in a PPDU including a PHY preamble and header.

In some implementations, the determining of the distance of the object may include determining, based on the feedback, a time at which an echo of a first pulse of the one or more pulses is detected by the first receiving device; determining an angle of departure of the first pulse at the wireless communication device; and calculating the distance of the object based at least in part on the angle of departure, the time at which the echo is detected by the first receiving device, and a time at which the first pulse is transmitted by the wireless communication device. In some implementations, the one or more pulses may include a sequence of pulses and the timing information may indicate a duration of each of the one or more pulses and a delay between the transmission of the codeword sequence and the beginning of the sequence of pulses.

In some implementations, the method may further include transmitting a second radar alert frame carrying the timing information to a second receiving device; transmitting a second codeword of the codeword sequence, using beamforming, in a direction of the second receiving device; and receiving feedback from the second receiving device responsive to the transmission of the one or more pulses. In some implementations, the feedback received from the first receiving device may indicate a first range of distances associated with the object and the feedback received from the second receiving device may indicate a second range of distances associated with the object.

In some implementations, the determining of the distance of the object may include determining, based on the feedback received from the first receiving device, a time at which an echo of a first pulse of the one or more pulses is detected by the first receiving device; and determining, based on the feedback received from the second receiving device, a time at which an echo of a second pulse of the one or more pulses is detected by the second receiving device, where the distance of the object is determined based on the time at which the echo of the first pulse is detected by the first receiving device and the time at which the echo of the second pulse is detected by the second receiving device.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 2A shows an example protocol data unit (PDU) usable for communications between an access point (AP) and a number of stations (STAs)

FIG. 2B shows an example field in the PDU of FIG. 2A.

FIG. 11B shows a flowchart illustrating an example process for wireless communication that supports multistatic radar measurements according to some implementations.

FIG. 11C shows a flowchart illustrating an example process for wireless communication that supports multistatic radar measurements according to some implementations.

FIG. 11D shows a flowchart illustrating an example process for wireless communication that supports multistatic radar measurements according to some implementations.

Like reference numbers and designations in the various drawings indicate like elements.

DETAILED DESCRIPTION

Figure 1:
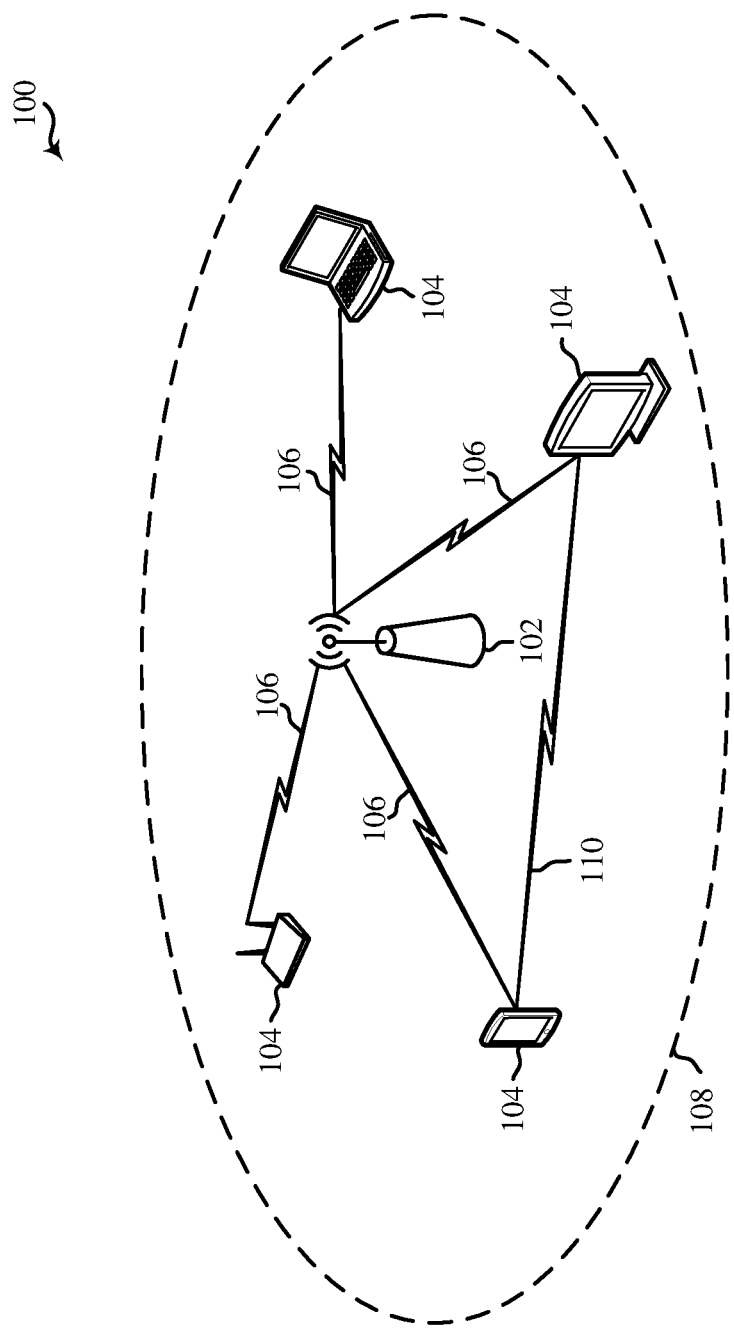
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE)

802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to synchronizing spatially diverse transmit and receive devices in multistatic radar systems. Some implementations more specifically relate to using signaling techniques and packet formats conforming to the IEEE 802.11 family of standards for performing multistatic radar measurements by one or more wireless communication devices. A WLAN may be formed by one or more access points (APs) that provide a shared wireless communication medium for use by a number of client devices also referred to as stations (STAs). The basic building block of a WLAN conforming to the IEEE 802.11 family of standards is a Basic Service Set (BSS), which is managed by an AP. Each BSS is identified by a Basic Service Set Identifier (BSSID) that is advertised by the AP. Wireless communication devices (such as APs and STAs) communicate by transmitting and receiving electromagnetic signals in the RF spectrum. Electromagnetic signals transmitted by a transmitting device may reflect off objects and surfaces along the transmission path before reaching a receiving device located a distance away. Accordingly, signaling techniques used in wireless communications (such as beamforming) may be well-suited for multistatic radar.

In some implementations, a transmitting device (also referred to as a "radar transmitter") may transmit, to a receiving device (also referred to as a "radar receiver"), a radar alert frame followed by a radar frame. The radar frame may include a codeword sequence (also referred to as a "synchronization sequence") and one or more radar pulses. As used herein, the term "radar pulse" may refer to any wireless signal that can be used to detect objects along its path of transmission based on radar techniques. The radar pulses may be transmitted, using beamforming, in a number of directions to detect objects in a vicinity of the radar system. Beamforming focuses the energy of each radar pulse in a narrow direction to compensate for path loss and achieve greater range. The radar alert frame may alert the receiving device of the upcoming radar frame. In some implementations, the radar alert frame may carry timing information that can be used to synchronize a receive (RX) clock of the receiving device with a transmit (TX) clock of the transmitting device. For example, the timing information may indicate a timing offset or delay between one or more codewords of the codeword sequence and the beginning of the radar pulses. The receiving device may detect one or more codewords of the codeword sequence and an echo of at least one of the radar pulses, and determine the time at which the corresponding pulse was transmitted by the transmitting device. The receiving device may compare the timing of the echo with the timing of the transmitted pulse to determine a relative distance of a target object that produced the echo.

Particular implementations of the subject matter described in this disclosure can be implemented to realize one or more of the following potential advantages. By leveraging wireless communication techniques defined by the IEEE 802.11 family of standards, aspects of the present disclosure may enable multistatic radar to be implemented by existing wireless communication systems and networks. For example, an AP (or STA) may perform the function of a radar transmitter and one or more STAs (or APs) may perform the functions of each radar receiver. In particular, the radar transmitter may use beamforming techniques to transmit highly directional radar pulses which may produce respective echoes when interacting with objects in the environment. The radar transmitter may use packet formats conforming to the IEEE 802.11 family of standards to communicate timing and synchronization information regarding the radar pulses to each radar receiver. Each radar receiver also may use such packet formats to provide feedback regarding the echoes to the radar transmitter. Further, multistatic radar implementations of the present disclosure obey the link access rules defined by existing IEEE 802.11 standards, thereby enabling radar functionality in frequency bands commonly used for wireless communications. Accordingly, aspects of the present disclosure may enable multistatic radar functionality to be implemented anywhere a WLAN is, or can be, deployed.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B14 within range of the STA or to select among multiple APs 102 that together form an extended service set (ESS) including multiple connected B14. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 also may include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

FIG. 2B shows an example L-SIG field 210 in the PDU of FIG. 2A. The L-SIG 210 includes a data rate field 212, a reserved bit 214, a length field 216, a parity bit 218, and a tail field 220. The data rate field 212 indicates a data rate (note that the data rate indicated in the data rate field 212 may not be the actual data rate of the data carried in the payload 204). The length field 216 indicates a length of the packet in units of, for example, bytes. The parity bit 218 is used to detect bit errors. The tail field 220 includes tail bits that are used by the receiving device to terminate operation of a decoder (for example, a Viterbi decoder). The receiving device utilizes the data rate and the length indicated in the data rate field 212 and the length field 216 to determine a duration of the packet in units of, for example, microseconds (μs).

Figure 3:
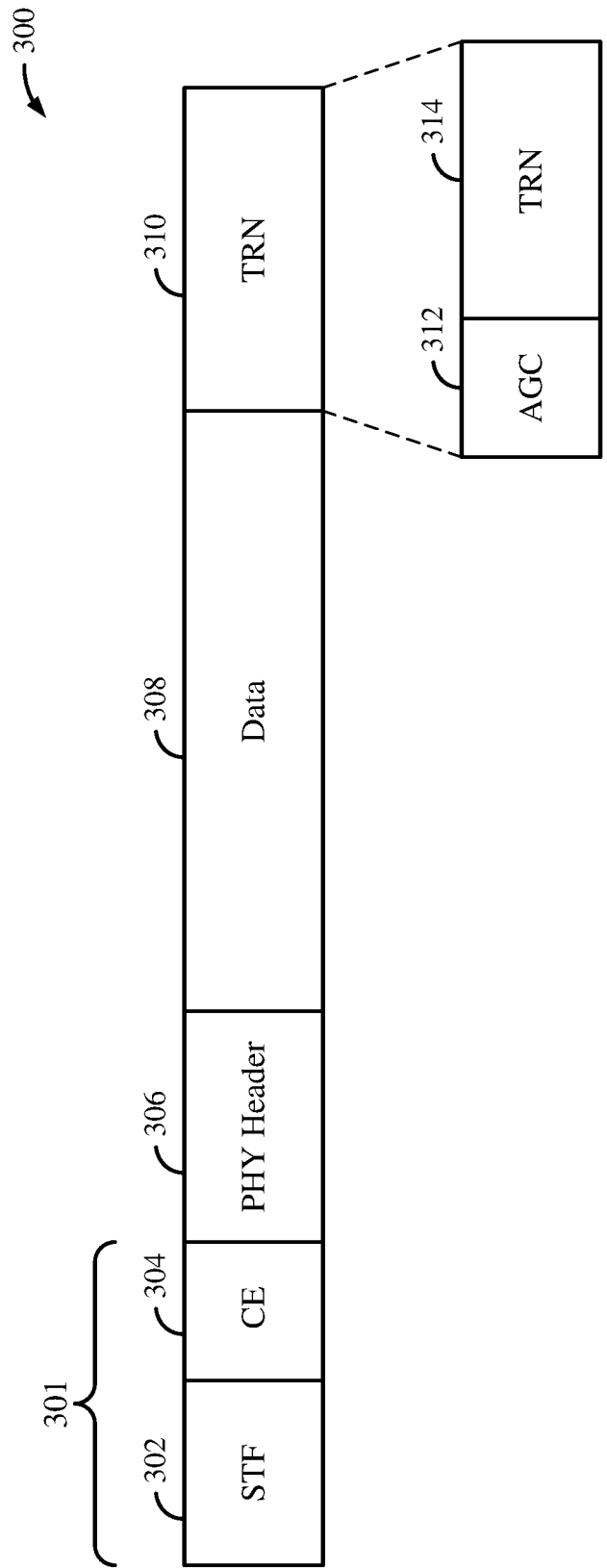
FIG. 3 shows another example PDU usable for communications between an AP and each of a number of STAs.

FIG. 3 shows another example PDU 300 usable for communications between an AP and a number of STAs. For example, the PDU 300 can be configured as a PPDU. As shown, the PDU 300 includes a PHY preamble 301, a PHY header 306, a data field 308, and a beamforming training field (TRN) 310. The PHY preamble 301 may include a short training field (STF) 302 and a channel estimation field (CE) 304. The STF 302 generally enables a receiving device to detect the PDU 300 as well as perform automatic gain control (AGC) and coarse timing and frequency estimation. The CE field 304 may be used by the receiving device to perform channel estimation. The PHY header 306 includes information associated with the data field 308 including, for example, a modulation and coding scheme (MCS), length, or checksum. The data field 308 may include payload data and padding (if any).

In high frequency (such as 60 GHz or millimeter wave (mmWave)) wireless communication systems (such as conforming to the IEEE 802.11ad or 802.11ay amendments of the IEEE 802.11 standard), communications may be beamformed using phased array antennas at the transmitter and the receiver. Beamforming generally refers to a wireless communication technique by which the transmitting device and the receiving device adjust transmit or receive antenna settings to achieve a desired link budget for subsequent communications. The procedure to adapt the transmit and receive antennas, referred to as beamforming training, may be performed initially to establish a link between the transmitting and receiving devices and also may be performed periodically to maintain a quality link using optimized transmit and receive beams.

The TRN field 310 may be used for beamforming training. More specifically, the TRN field 310 may be used by the receiving device to tune or configure its antennas for directional beamforming. For example, the receiving device may determine, based on the TRN field 310, which antenna sectors (of a phased array antenna) should be used for transmitting and receiving corresponding beams. The TRN field 310 may include an AGC subfield 312 and one or more TRN subfields 314. The AGC subfield 312 enables the receiving device to readjust its AGC settings to receive the TRN subfields 314. The TRN subfields 314 may include Golay sequences that can be used to determine an antenna weight vector (AWV) to be applied to the transmit antennas or receive antennas used for beamforming. For example, the AWV may describe the amplitude or phase to be applied to each transmit or receive antenna. The number of TRN subfields 314 may vary depending on whether the TRN field 310 is used for transmit AWV training or receive AWV training.

Figure 4:
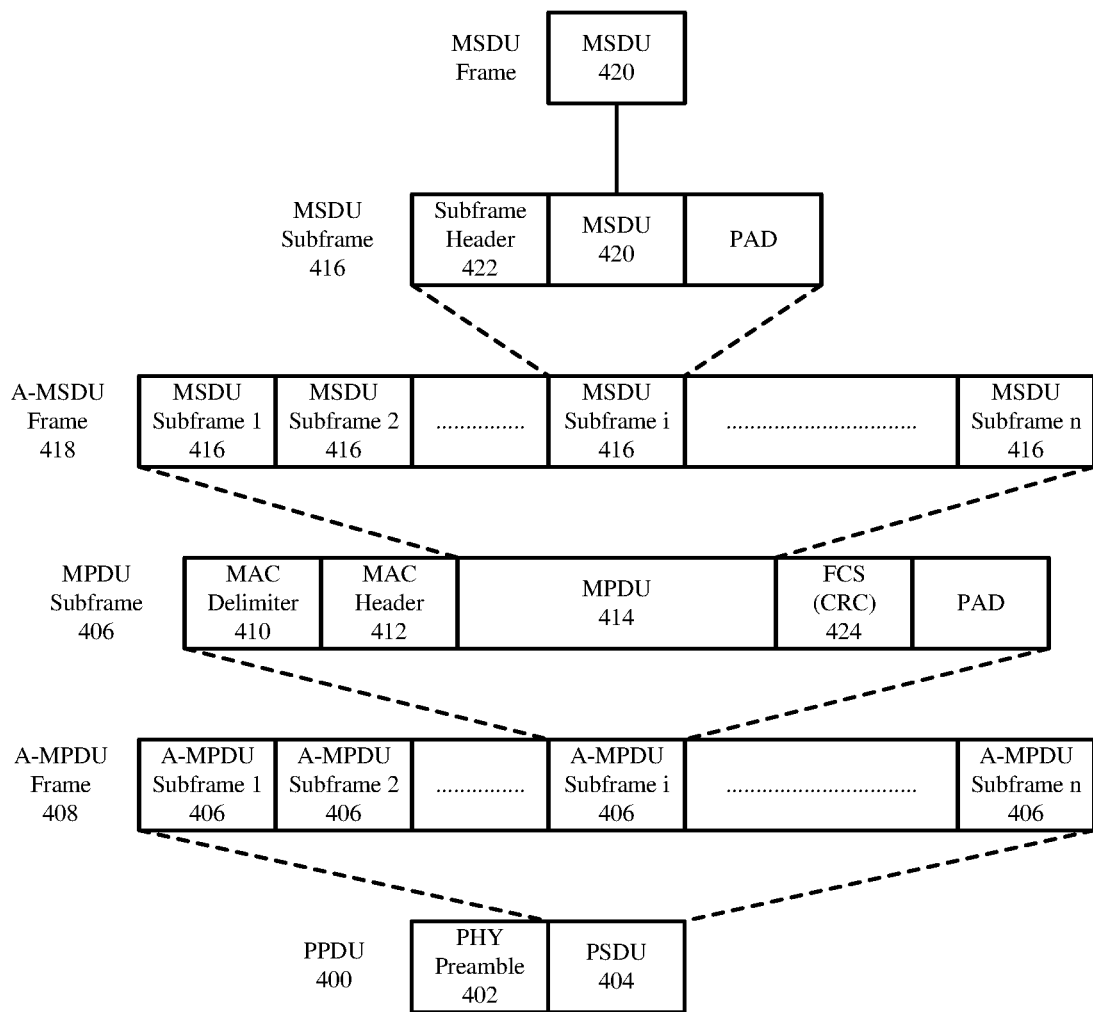
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 also may include a frame check sequence (FCS) field 424 for error detection. For example, the FCS field 416 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102).

To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
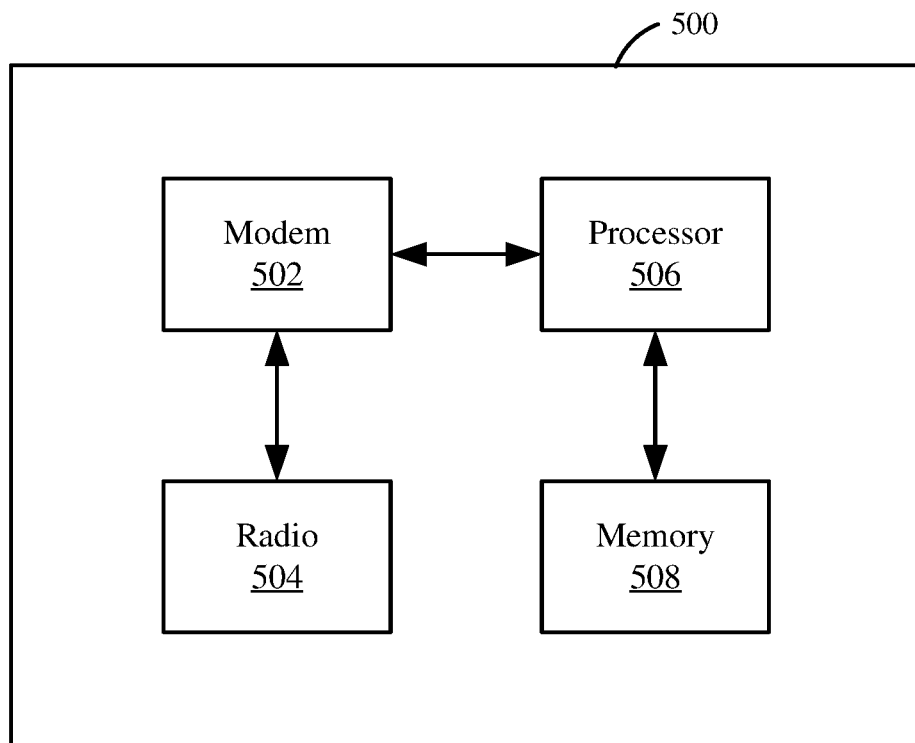
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
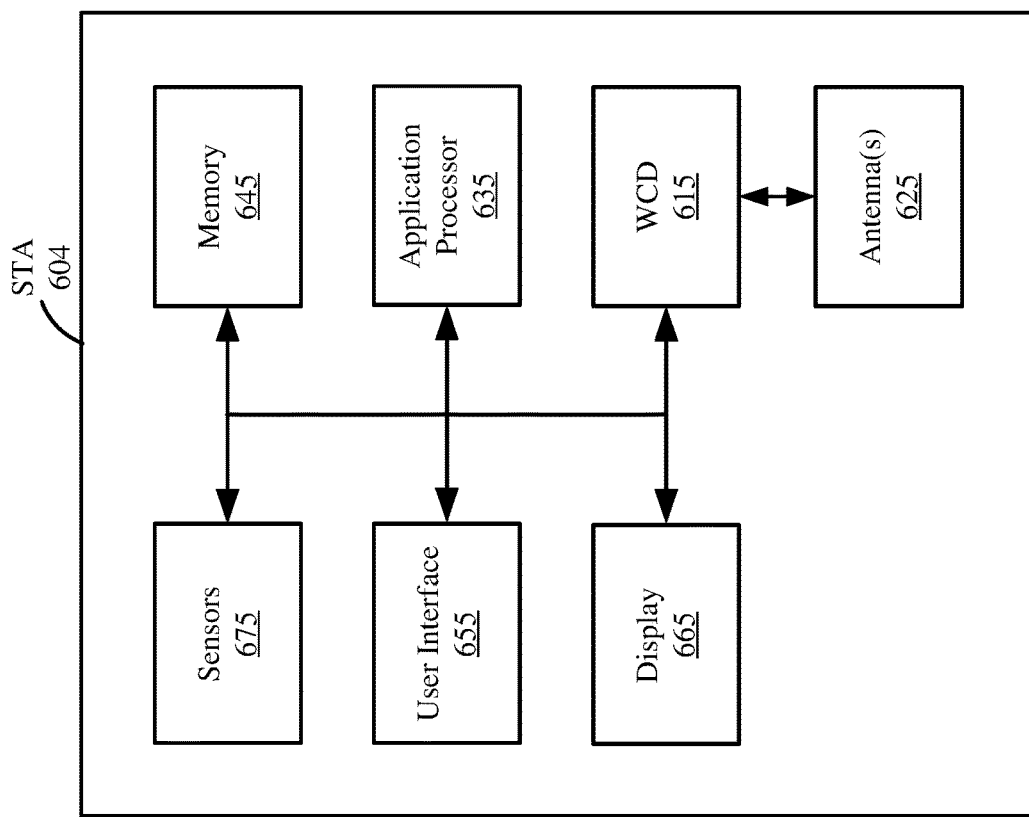
FIG. 6B shows a block diagram of an example station (STA).
Figure 6A:
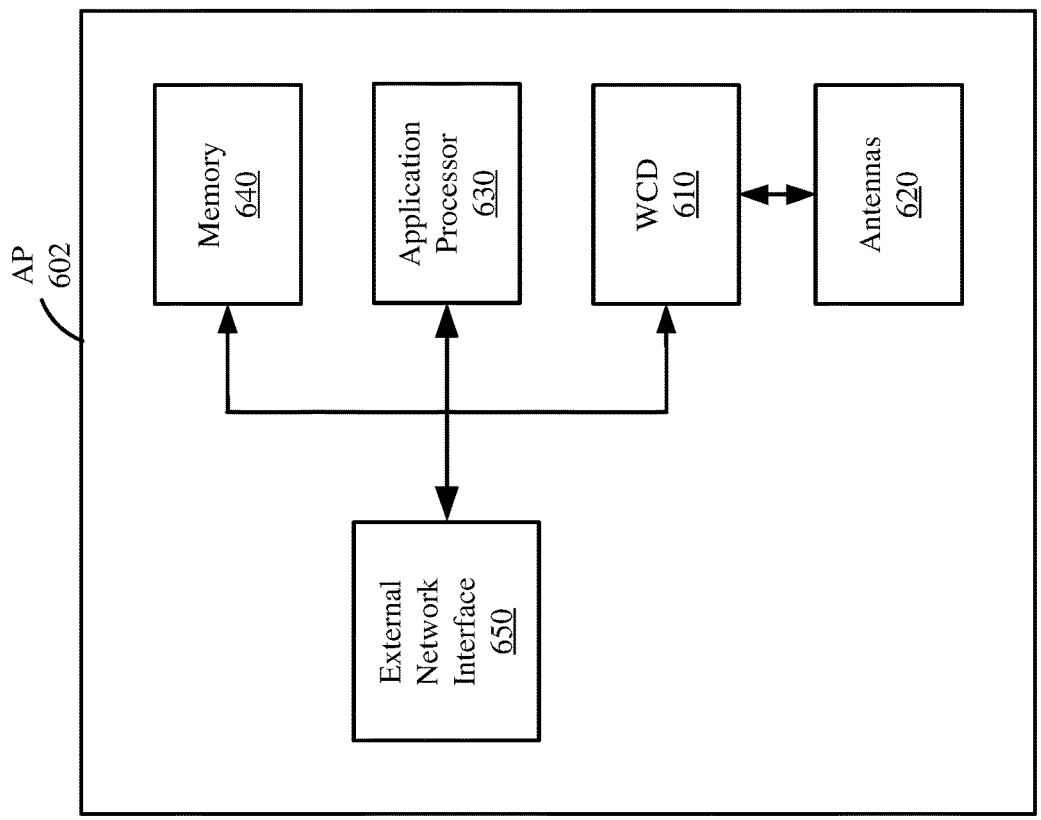
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As described above, signaling techniques used in wireless communications (such as beamforming) may be well-suited for multistatic radar. In a multistatic radar system, the transmit antennas are located a substantial distance away from the receive antennas. The spatial diversity afforded by multistatic systems provides a high accuracy of target location and allows different aspects of a target to be viewed simultaneously. However, to achieve the necessary amount of separation between the transmit antennas and receive antennas, many multistatic radar systems are implemented using multiple devices with no wired communication between them. For example, the transmit antennas may be disposed on a transmit device and the receive antennas may be disposed on one or more spatially diverse receive devices (with a shared or partially shared coverage area). The transmit device may transmit pulses in various directions and the receive devices may detect the resulting echoes. The transmit and receive devices use separate clocks for the timing of pulse transmissions and echo detection.

In some implementations, a transmitting device may transmit, to one or more receiving devices, a radar alert frame followed by a radar frame. The radar frame may include a codeword sequence and one or more radar pulses. As used herein, the term "radar pulse" may refer to any wireless signal that can be used to detect objects along its path of transmission based on radar techniques. The radar alert frame may alert each receiving device of the upcoming radar frame. The radar pulses may be transmitted, using beamforming, in a number of directions to detect target objects in a vicinity of the radar system. Beamforming focuses the energy of each radar pulse in a narrow direction to compensate for path loss and achieve greater range. In some implementations, the radar alert frame may carry timing information that can be used to synchronize a receive (RX) clock of each receiving device with a transmit (TX) clock of the transmitting device. For example, the timing information may indicate a timing offset or delay between one or more codewords of the codeword sequence and the beginning of the radar pulses. Each receiving device may detect one or more codewords of the codeword sequence and an echo of at least one of the radar pulses, and determine the time at which the corresponding pulse was transmitted by the transmitting device. Each receiving device may compare the timing of the echo with the timing of the transmitted pulse to determine a relative distance of a target object that produced the echo.

Figure 7:
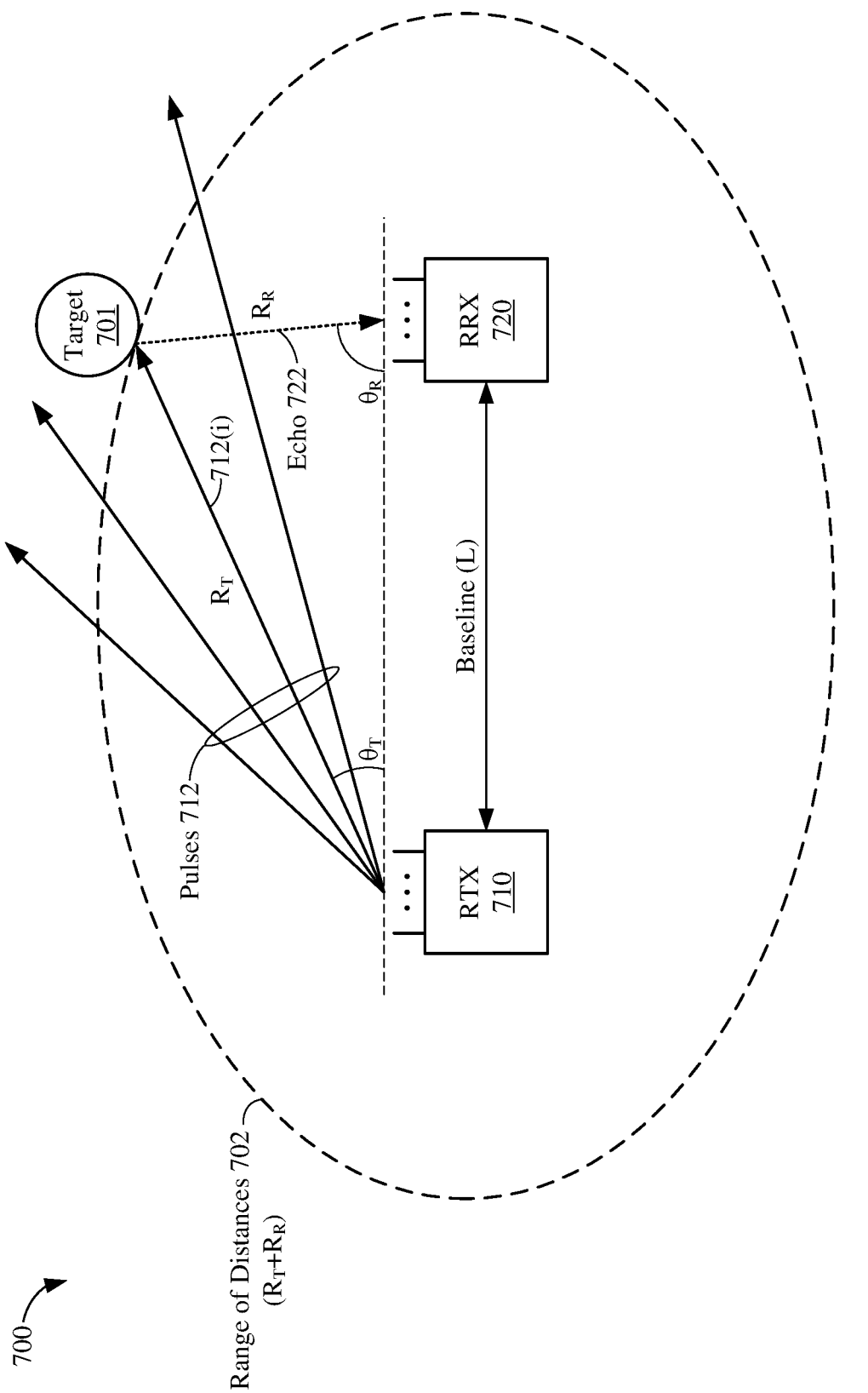
FIG. 7 shows an example bistatic radar system according to some implementations.

FIG. 7 shows an example bistatic radar system 700 according to some implementations. The bistatic radar system 700 includes a radar transmitter (RTX) 710 and a radar receiver (RRX) 720. The radar transmitter 710 and the radar receiver 720 are spatially separated by a baseline (L). In some implementations, the radar transmitter 710 may be one example of the AP 102 of FIG. 1 or the AP 602 of FIG. 6A and the radar receiver 720 may be one example of the STA 104 of FIG. 1 or the STA 604 of FIG. 6B.

The radar transmitter 710 is configured to transmit radar pulses 712 in a number of directions. Each of the pulses 712 may be a beamformed RF signal having a particular width and directionality. Objects or surfaces along the trajectory of any of the pulses 712 may cause the pulses 712 to reflect or scatter. Reflected pulses may be referred to as "echoes" of the pulses from which they originate. In the example of FIG. 7, a target object 701 is located along the path of one of the radar pulses 712. The radar pulse 712(i) incident on the target object 701 is reflected as an echo 722. As shown in FIG. 7, the echo 722 is reflected in the direction of the radar receiver 720. In some implementations, the radar receiver 720 may determine a distance ($R_R$) of the target object 701 relative to the radar receiver 720 based, at least in part, on the baseline distance L between the radar transmitter 710 and the radar receiver 720, an angle of arrival ($\theta_R$) of the echo 722, and a time of flight ($\tau$) from the transmission of the incident pulse 712(i) by the radar transmitter 710 to the reception of the resulting echo 722 by the radar receiver 720. More specifically, the distance $R_R$ can be calculated according to Equation 1.

$$R_R = (R_T + R_R)^2 - L^2/2(R_T + R_R - L \cos \theta_R) \quad (1)$$

where $R_T + R_R$ represents the combined distances from the target object 701 to each of the radar transmitter 710 and the radar receiver 720. As shown in FIG. 7, $R_T + R_R$ defines a range of distances 702 around the radar transmitter 710 and the radar receiver 720 (in the shape of an ellipse) in which the target object 701 may be located. More specifically, $R_T + R_R$ can be calculated, according to Equation 2, as a function of the baseline (L), the time of flight of the reflected pulse ($\tau$), and the propagation speed of the radar pulses ($c_p$).

$$R_T + R_R = c_p \tau + L \quad (2)$$

With reference to Equations 1 and 2, the baseline L and propagation speed $c_p$ represent fixed or preconfigured values inherent to the radar system 700. The angle of arrival $\theta_R$ may be determined based on a time difference of arrival (TDOA) of the echo 722 between different receive antennas of the radar receiver 720 or based on the antenna sector (corresponding to a preset beam of a phased array antenna) used by the radar receiver 720 to receive the echo 722. However, to calculate the time of flight $\tau$, the radar receiver 720 must have knowledge of the time at which the incident pulse 712(i) was transmitted at the position of the receiver. More specifically, the time of flight $\tau$ can be calculated, according to Equation 3, as a function of the time of transmission of the incident pulse ($T_{pulse}$) and the time of reception of the echo ($T_{echo}$).

$$\tau = T_{echo} - T_{pulse} \quad (3)$$

Because the radar transmitter 710 and the radar receiver 720 are implemented in (or correspond to) separate wireless communication devices, the radar transmitter 710 may need to communicate the timing of the transmission of the incident pulse $T_{pulse}$ to the radar receiver 720. However, because the radar transmitter 710 transmits pulses 712 in a number of directions, the radar transmitter 710 may be unaware as to which of the pulses 712 is incident on the target object 701. Accordingly, the radar transmitter 710 may need to communicate the timing of each of the pulses 712 to the radar receiver 720, and the radar receiver 720 may need to determine which of the pulses 712 resulted in the echo 722. Aspects of the present disclosure recognize that packet formats in accordance with IEEE 802.11 standards may be well-suited for communicating such timing information ($T_{pulse}$) from the radar transmitter 710 to the radar receiver 720.

In some implementations, the radar transmitter 710 may transmit a radar alert frame followed by a codeword sequence to the radar receiver 720 prior to transmitting the radar pulses 712. The radar alert frame may alert the radar receiver 720 of the upcoming radar pulses 712. In some aspects, the radar alert frame may include timing information that can be used to synchronize a receiver (RX) clock of the radar receiver 720 with a transmit (TX) clock of the radar transmitter 710. For example, the timing information may indicate a timing offset or delay between one or more codewords of the codeword sequence and the beginning of the transmission of the radar pulses 712. Thus, upon detecting one or more codewords of the codeword sequence and the subsequent echo 722, the radar receiver 720 may determine the time at which the incident pulse 712(i) was transmitted by the radar transmitter 710. The radar receiver 720 may compare the timing of the echo $T_{echo}$ with the timing of the transmitted pulse $T_{pulse}$ to determine the distance $R_R$ of the target object 701 (such as described with respect to Equations 1-3).

In some implementations, the radar transmitter 710 also may determine its relative distance $R_T$ to the target object 701. For example, in some aspects, the radar receiver 720 may feedback timing information to the radar transmitter 710. The timing information may include the timing of the echo $T_{echo}$, the timing of the transmitted pulse $T_{pulse}$, or the time of flight $\tau$. The radar transmitter 710 may then calculate the distance $R_T$ based, at least in part, on the angle of departure $\theta_T$ of the incident pulse 712(i). For example, the radar transmitter 710 may calculate the distance $R_T$ by substituting the angle of departure $\theta_T$ for the angle of arrival $\theta_R$ in Equation 1. The radar transmitter 710 may determine the angle of departure $\theta_T$ based on the antenna sector (corresponding to a preset beam of a phased array antenna) used by the radar transmitter 710 to transmit the incident pulse 712(i).

Figure 8:
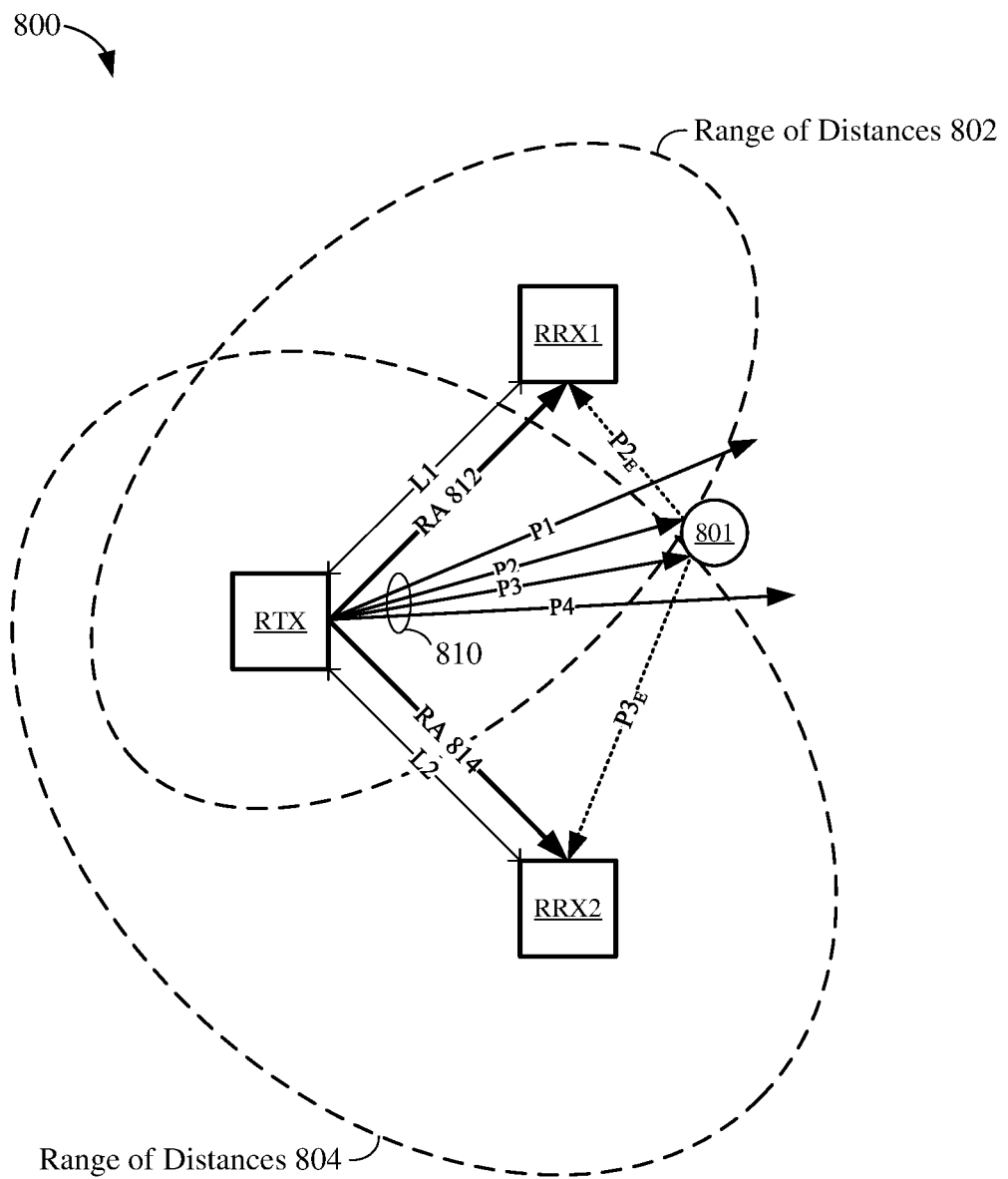
FIG. 8 shows an example multistatic radar system according to some implementations.

FIG. 8 shows an example multistatic radar system 800 according to some implementations. The multistatic radar system 800 includes a radar transmitter RTX and multiple spatially diverse radar receivers RRX1 and RRX2. Although two radar receivers RRX1 and RRX2 are shown in the example of FIG. 8, the multistatic radar system 800 may include any number of radar receivers in actual implementations. The radar transmitter RTX is spatially separated from each of the radar receivers RRX1 and RRX2 by baseline distances L1 and L2, respectively. In some implementations, the radar transmitter RTX may be one example of the AP 102 of FIG. 1 or the AP 602 of FIG. 6A and each of the radar receivers RRX1 and RRX2 may be one example of the STA 104 of FIG. 1 or the STA 604 of FIG. 6B.

In some implementations, the radar transmitter RTX may transmit radar alert (RA) frames 812 and 814 to the radar receivers RRX1 and RRX2, respectively. For example, the first radar alert frame 812 may be transmitted, using beamforming, in a direction of the first radar receiver RRX1 and the second radar alert frame 814 may be transmitted, using beamforming, in a direction of the second radar receiver RRX2. In some implementations, each of the radar alert frames 812 and 814 may be a clear-to-send (CTS)-to-self frame as defined by, for example, the IEEE 802.11ay amendment to the 802.11 standard. The radar alert frames 812 and 814 may alert the respective radar receivers RRX1 and RRX2 of an upcoming radar frame 810. In some aspects, the radar alert frames 812 and 814 may carry timing information that can be used to synchronize RX clocks in the radar receivers RRX1 and RRX2, respectively, with a TX clock of the radar transmitter RTX. In some other aspects, the radar alert frames 812 and 814 may indicate a pulse interval or duration between successive pulses P1-P4.

In some implementations, the radar frame 810 may include a codeword sequence (not shown for simplicity) followed by a sequence of radar pulses P1-P4. As described in greater detail with reference to FIG. 9, the codeword sequence may be used by the radar receivers RRX1 and RRX2 to calculate a relative start time of the sequence of pulses P1-P4. For example, the timing information included in the first radar alert frame 812 may indicate a timing offset or delay between one or more codewords of the codeword sequence and the start of the pulse sequence. After detecting one or more codewords of the codeword sequence, the first radar receiver RRX1 may determine the start time of the pulse sequence relative to its own internal clock based on the timing information provided in the first radar alert frame 812. Similarly, the timing information included in the second radar alert frame 814 may indicate a timing offset or delay between one or more portions of the codeword sequence and the start of the pulse sequence. After detecting one or more codewords of the codeword sequence, the second radar receiver RRX2 may determine the start time of the pulse sequence relative to its own internal clock based on the timing information provided in the second radar alert frame 814.

Each of the pulses P1-P4 may be a beamformed RF signal having a particular width and directionality. Although four radar pulses P1-P4 are shown in the example of FIG. 8, the radar frame 810 may include any number of radar pulses in actual implementations. Objects or surfaces along the trajectory of any of the pulses P1-P4 may cause the pulses to reflect or scatter, producing echoes. In the example of FIG. 8, a target object 801 is located along the path of two radar pulses P2 and P3. The pulses P2 and P3 incident on the target object 801 are reflected as echoes $P2_E$ and $P3_E$, respectively. As shown in FIG. 8, the first echo $P2_E$ is reflected in the direction of the first radar receiver RRX1 and the second echo $P3_E$ is reflected in the direction of the second radar receiver RRX2. In some implementations, the radar receivers RRX1 and RRX2 may detect the echoes $P2_E$ and $P3_E$, respectively, based on changes in a channel impulse response (CIR). For example, each of the radar receivers RRX1 and RRX2 may detect an incident echo when the CIR measured by the radar receiver peaks or exceeds a threshold energy level.

In some implementations, each of the radar receivers RRX1 and RRX2 may calculate a respective distance ($R_R$) of the target object 801 according to Equations 1-3. For example, each of the radar receivers RRX1 and RRX2 may calculate a time-of-flight (τ) of a respective echo ($P2_E$ or $P3_E$) based, at least in part, on the timing information included in the radar alert frames 812 and 814 and the codeword sequence of the radar frame 810. As described above, each of the radar receivers RRX1 and RRX2 may use the timing information and codeword sequence to determine a relative start time of the pulse sequence. In some aspects, the radar receivers RRX1 and RRX2 may determine, based on the start time of the pulse sequence and the pulse duration, which of the pulses P1-P4 resulted in the detected echoes $P2_E$ and $P3_E$. For example, the first radar receiver RRX1 may determine that the first echo $P2_E$ is a reflection of the second pulse P2 of the pulse sequence due to the temporal proximity of P2 to $P2_E$. Similarly, the second radar receiver RRX2 may determine that the second echo $P3_E$ is a reflection of the third pulse P3 in the pulse sequence due to the temporal proximity of P3 to $P3_E$. In some other aspects, the pulses P1-P4 may be encoded with information (such as a unique Golay sequence) that can be used by the receiving devices RRX1 and RRX2 for identification purposes.

After identifying the incident pulses P2 and P3 that resulted in the echoes $P2_E$ and $P3_E$, the radar receivers RRX1 and RRX2 may determine the times at which the incident pulses P2 and P3, respectively, were transmitted by the radar transmitter RTX. For example, communications from the radar transmitter RTX to the radar receivers RRX1 and RRX2 undergo a propagation delay based on the propagation speed ($c_p$) of the wireless signals and the distances L1 and L2, respectively, between the devices. Since the propagation speed and distances are known or fixed quantities, each of the radar receivers RRX1 and RRX2 also may know its respective propagation delay. Accordingly, each of the radar receivers RRX1 and RRX2 may calculate the timing of a transmitted pulse at the radar transmitter RTX ($T_{pulse,TX}$), according to Equation 4, as a function of the timing of the transmitted pulse relative to the radar receiver ($T_{pulse,RX}$) and the propagation delay.

$$T_{pulse,TX} = T_{pulse,RX} - \text{Propagation\_Delay} \quad (4)$$

Substituting $T_{pulse,TX}$ (Equation 4) for $T_{pulse}$ in Equation 3 yields:

$$\tau = T_{echo} - T_{pulse,RX} + \text{Propagation\_Delay} \quad (5)$$

With reference to Equation 5, each of the radar receivers RRX1 and RRX2 may calculate a time of flight T based on the time at which an echo is detected $T_{echo}$, the time at which the corresponding pulse is transmitted $T_{pulse,RX}$ relative to the radar receiver (as determined based on the timing information included in the radar alert frames 812 or 814 and the codeword sequence in the radar frame 810), and the propagation delay between the radar receiver and the radar transmitter RTX. In some implementations, each of the radar receivers RRX1 and RRX2 may use its calculated time of flight T to determine a relative distance ($R_R$) to the target object 801 (according to Equations 1 and 2).

In some implementations, the radar transmitter RTX may determine its relative distance ($R_T$) to the target object 801. For example, in some aspects, one or more of the radar receivers RRX1 or RRX2 may feedback timing information to the radar transmitter RTX. The timing information may include the timing of an echo $T_{echo}$, the timing of a transmitted pulse $T_{pulse,RX}$ or $T_{pulse,TX}$, or a time of flight τ. In some aspects, the radar transmitter RTX may calculate the distance $R_T$ based on the angle of departure $\theta_T$ with respect to one or more of the incident pulses (such as described with respect to FIG. 7).

In some other aspects, the radar transmitter RTX may calculate a distance of the target object 801 based on the intersection of timing information received from the radar receivers RRX1 and RRX2. For example, as shown in FIG. 8, time-of-flight information received from the first radar receiver RRX1 (τ1) indicates a range of distances 802 around the radar transmitter RTX and the first radar receiver RRX1 in which the target object 801 may be located. Similarly, time-of-flight information received from the second radar receiver RRX2 (τ2) indicates a range of distances 804 around the radar transmitter RTX and the second radar receiver RRX2 in which the target object 801 may be located. Accordingly, the radar transmitter RTX may determine a more precise location or distance of the target object 801 based on the intersection of the range of distances 802 and the range of distances 804 (such as the intersection of the ellipses 802 and 804).

Figure 9:
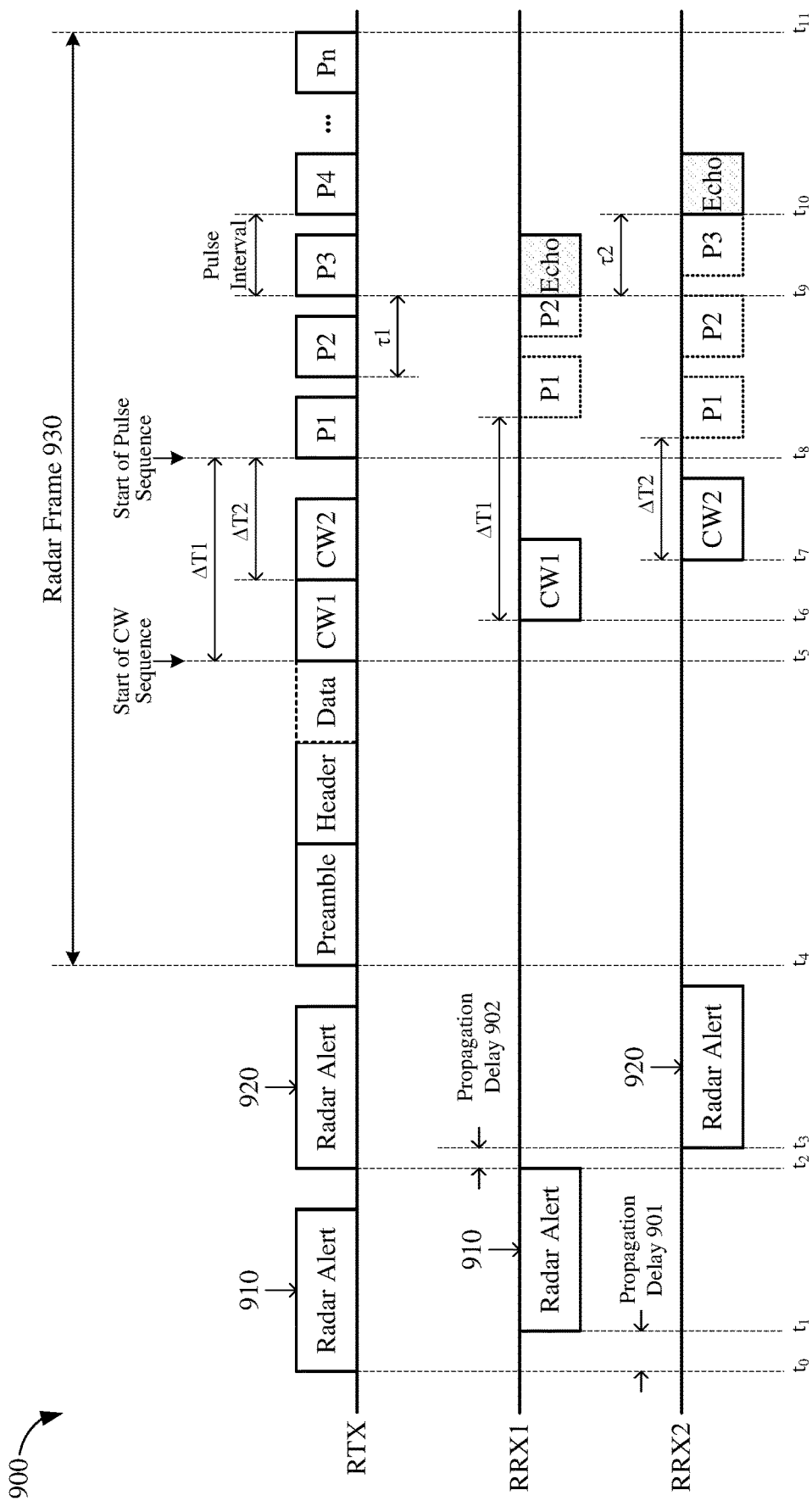
FIG. 9 shows a timing diagram illustrating example communications between a radar transmitter and multiple radar receivers according to some implementations.

FIG. 9 shows a timing diagram 900 illustrating example communications between a radar transmitter RTX and multiple radar receivers RRX1 and RRX2 according to some implementations. In some implementations, the radar transmitter RTX and radar receivers RRX1 and RRX2 may belong to a multistatic radar system, such as the multistatic radar system 800 of FIG. 8. Thus, the radar transmitter RTX and the radar receivers RRX1 and RRX2 may be examples of the radar transmitter RTX and the radar receivers RRX1 and RRX2, respectively, of FIG. 8.

At time t0, the radar transmitter RTX transmits a radar alert frame 910 to the first radar receiver RRX1. In some implementations, the radar alert frame 910 may be a CTS-to-self frame in accordance with the IEEE 802.11ay amendment of the IEEE 802.11 standard. For example, the receiver address (RA) field of the CTS-to-self frame may include the address of the radar transmitter RTX and may be used to indicate, to the first radar receiver RRX1, the address to which feedback is to be reported. The radar alert frame 910 may be transmitted, using beamforming, in a direction of the first radar receiver RRX1 and may alert the first radar receiver RRX1 of an upcoming radar frame 930. In some aspects, the CTS-to-self frame may include a control trailer carrying association identifier (AID) values associated with one or more radar receivers (including the first radar receiver RRX1).

In some implementations, the control trailer of the radar alert frame 910 may further carry timing information associated with the radar frame 930. In some aspects, the timing information may identify one or more unique codewords CW1 or CW2 in the radar frame 930. In some other aspects, the timing information may further indicate a timing offset ΔT1 or ΔT2 between the codewords CW1 or CW2, respectively, and a start of the pulse sequence (at time t8). Still further, in some aspects, the timing information may indicate a pulse interval between successive radar pulses P1-Pn of the radar frame 930.

The first radar receiver RRX1 receives the radar alert frame 910, at time $t_1$, after a propagation delay 901. Upon receiving the radar alert frame 910, the first radar receiver RRX1 may store the timing offset information and the pulse interval information included therein. The first radar receiver RRX1 may proceed to listen for the upcoming radar frame 930 to be transmitted by the radar transmitter RTX. For example, the first radar receiver RRX1 may tune a plurality of receive antennas in a direction of the radar transmitter RTX. More specifically, the first radar receiver RRX1 may configure its receive antennas to receive beamformed signals from the radar transmitter RTX. In some implementations, the first radar receiver RRX1 may continue listening for the radar frame 930 until it detects one or more of the codewords CW1 or CW2 of the radar frame 930.

At time t2, the radar transmitter RTX transmits a radar alert frame 920 to the second radar receiver RRX2. In some implementations, the radar alert frame 920 may be a CTS-to-self frame. For example, the RA field of the CTS-to-self frame may include the address of the radar transmitter RTX and may be used to indicate, to the second radar receiver RRX2, the address to which feedback is to be reported. The radar alert frame 920 may be transmitted, using beamforming, in a direction of the second radar receiver RRX2 and may alert the second radar receiver RRX2 of the upcoming radar frame 930. In some aspects, the CTS-to-self frame may include a control trailer carrying AID values associated with one or more radar receivers (including the second radar receiver RRX2).

In some implementations, the control trailer of the radar alert frame 920 may further carry timing information associated with the radar frame 930. In some aspects, the timing information may identify one or more of the codewords CW1 or CW2 in the radar frame 930. In some other aspects, the timing information may further indicate a timing offset or delay ΔT1 or ΔT2 between the codewords CW1 or CW2, respectively, and the start of the pulse sequence (at time t8). Still further, in some aspects, the timing information may indicate a pulse interval between successive radar pulses P1-Pn of the radar frame 930.

The second radar receiver RRX2 receives the radar alert frame 920, at time t3, after a propagation delay 902. Upon receiving the radar alert frame 920, the second radar receiver RRX2 may store the timing offset information and the pulse interval information included therein. The second radar receiver RRX2 may further listen for the upcoming radar frame 930 to be transmitted by the radar transmitter RTX. For example, the second radar receiver RRX2 may tune a plurality of receive antennas in a direction of the radar transmitter RTX. More specifically, the second radar receiver RRX2 may configure its receive antennas to receive beamformed signals from the radar transmitter RTX. In some implementations, the second radar receiver RRX2 may continue listening for the radar frame 930 until it detects one or more of the codewords CW1 or CW2 of the radar frame 930.

The radar transmitter RTX transmits the radar frame 930 from times $t_4$ to $t_{11}$. In some implementations, the radar frame 930 may be a new type of PPDU based, at least in part, on a packet structure defined by existing IEEE 802.11 standards (such as the PDU 300 of FIG. 3). For example, the radar frame 930 may include a preamble, a header, a codeword sequence, and one or more radar pulses P1-Pn. With reference for example to FIG. 3, the preamble and header of the radar frame 930 may be one example of the PHY preamble 301 and PHY header 306, respectively, of the PDU 300. However, the TRN field 310 (or TRN subfields 314) of the PDU 300 may be repurposed as the codeword sequence and radar pulse sequence of the radar frame 930. In some aspects, the radar frame 930 may include payload data (such as provided in the data field 308 of FIG. 3). In some other aspects, the radar frame 930 may not include any payload data. The codeword sequence may include one or more unique codewords CW1 and CW2. Although two codewords CW1 and CW2 are shown in the example of FIG. 9, the radar frame 930 may include any number of codewords in actual implementations.

In some implementations, each of the codewords may represent a respective Golay sequence. Due to their auto-correlation characteristics, complementary Golay sequences are often used for channel estimation. For example, existing versions of the IEEE 802.11 standard provide techniques for generating Golay sequences that may be included in a beamforming training field of a PPDU (such as the TRN field 310 of FIG. 3). In some aspects, Golay sequences may be repurposed for the codeword sequence of the radar frame 930. For example, different Golay sequences may be assigned or otherwise associated with different "colors" which may be known to the radar receivers RRX1 and RRX2. Accordingly, each of the codewords CW1 and CW2 may represent a different colored Golay sequence.

In some implementations, the radar transmitter RTX may transmit various portions of the radar frame 930, using beamforming, in different directions. In the example of FIG. 9, neither the first radar receiver RRX1 nor the second radar receiver RRX2 receives the preamble or header of the radar frame 930. However, beginning at time $t_5$, at least one of the codewords CW1 or CW2 in the codeword sequence may be transmitted (using beamforming) in a direction of each of the receivers RRX1 and RRX2. More specifically, in the example of FIG. 9, the first codeword CW1 is transmitted in the direction of the first radar receiver RRX1 and the second codeword CW2 is transmitted in the direction of the second radar receiver RRX2. In some implementations, the pulses P1-Pn may be one example of one of the pulses P1-P4 of FIG. 8. Thus, each of the pulses P1-Pn may be transmitted, using beamforming, in a different direction (such as shown in FIG. 8).

The first radar receiver RRX1 receives the first codeword CW1 at time $t_6$. Upon receiving the first codeword CW1, the first radar receiver RRX1 may determine a relative start of the pulse sequence $(t_6+\Delta T1)$ based on the timing offset $\Delta T1$ associated with the first codeword CW1. Further, the first radar receiver RRX1 may begin tuning (or positioning) its receive antennas in various directions to detect echoes of the radar pulses P1-Pn. For example, the first radar receiver RRX1 may reconfigure its receive antennas to detect echoes from objects that may be located anywhere in the vicinity of the first radar receiver RRX1. In the example of FIG. 9, the first radar receiver RRX1 detects an echo at time $t_9$. The first radar receiver RRX1 may further determine, based on the relative start of the pulse sequence $(t_6+\Delta T1)$ and the pulse interval, that the received echo is a reflection of the second pulse P2. The first radar receiver RRX1 may then determine a time of flight $\tau 1$ of the second pulse P2 (such as by using Equation 5).

In some implementations, the first radar receiver RRX1 may calculate a relative distance of a target object based, at least in part, on the time of flight $\tau 1$ of the second pulse P2 (such as described with respect to FIGS. 7 and 8). In some other implementations, the first radar receiver RRX1 may transmit feedback to the radar transmitter RTX based on the detected echo. For example, the feedback may indicate the timing of the echo, the timing of the second pulse P2 (in relation to the first radar receiver RRX1 or the radar transmitter RTX), or the time of flight $\tau 1$ associated with the second pulse. In such implementations, the radar transmitter RTX may use the feedback from the first radar receiver RRX1 to calculate its relative distance to the target object (such as described with respect to FIGS. 7 and 8).

The second radar receiver RRX2 receives the first codeword CW2 at time $t_7$. Upon receiving the second codeword CW2, the second radar receiver RRX2 may determine a relative start of the pulse sequence $(t_7+\Delta T2)$ based on the timing offset $\Delta T2$ associated with the second codeword CW2. Similar to the first radar receiver RRX1, the second radar receiver RRX2 may begin tuning (or positioning) its receive antennas in various directions to detect echoes of the radar pulses P1-Pn. In the example of FIG. 9, the second radar receiver RRX2 detects an echo at time $t_{10}$. The second radar receiver RRX2 may further determine, based on the relative start of the pulse sequence $(t_7+\Delta T2)$ and the pulse interval, that the received echo is a reflection of the third pulse P3. The second radar receiver RRX2 may then determine a time of flight $\tau 2$ of the third pulse P3 (such as by using Equation 5).

In some implementations, the second radar receiver RRX2 may further calculate a relative distance of a target object based, at least in part, on the time of flight $\tau 2$ of the third pulse P3 (such as described with respect to FIGS. 7 and 8). In some other implementations, the second radar receiver RRX2 may transmit feedback to the radar transmitter RTX based on the detected echo. For example, the feedback may indicate the timing of the echo, the timing of the third pulse P3 (in relation to the second radar receiver RRX2 or the radar transmitter RTX), or the time of flight $\tau 2$ associated with the third pulse. In such implementations, the radar transmitter RTX may use the feedback from the second radar receiver RRX2 to calculate its distance to the target object (such as described with respect to FIGS. 7 and 8).

Figure 10A:
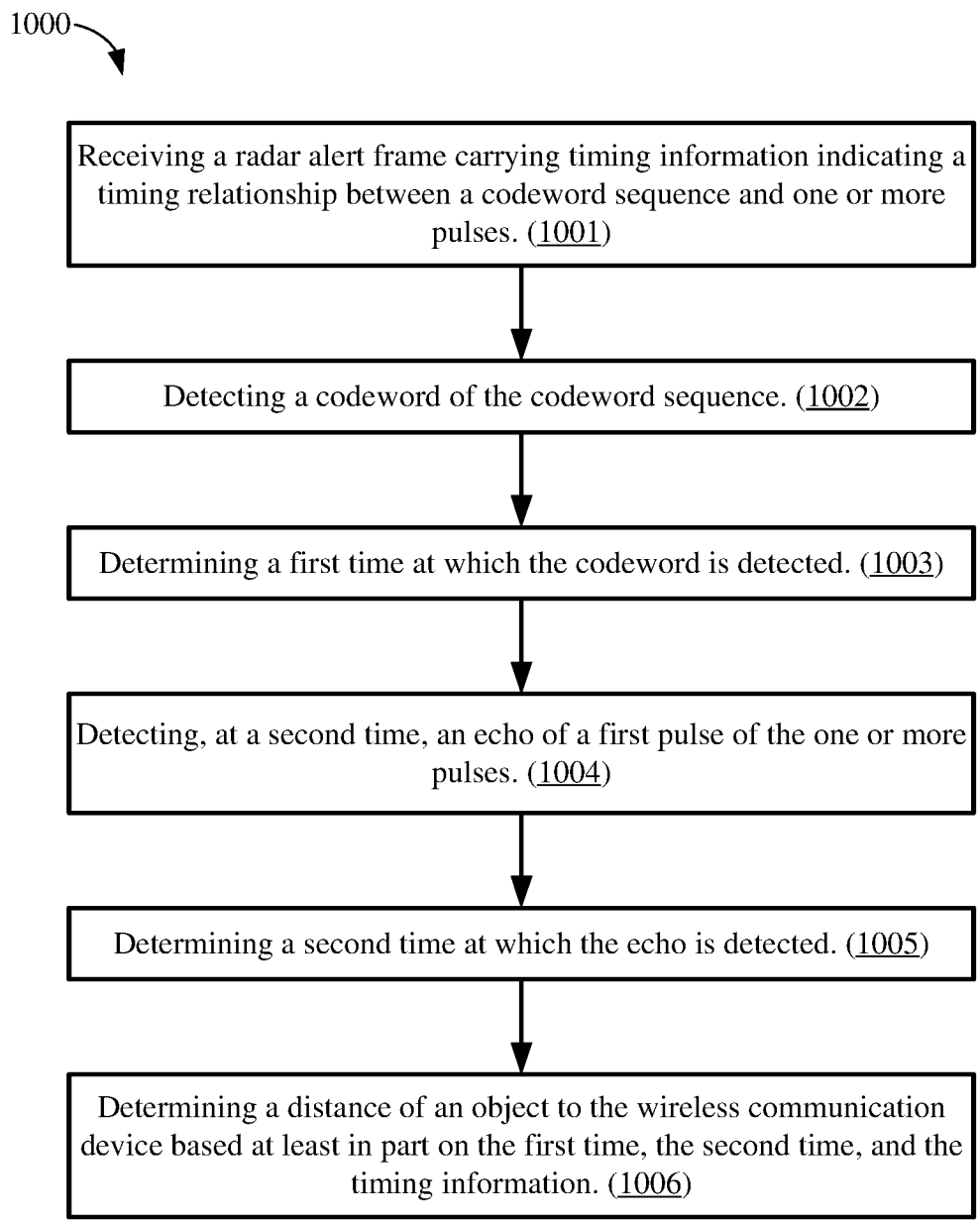
FIG. 10A shows a flowchart illustrating an example process for wireless communication that supports multistatic radar measurements according to some implementations.

FIG. 10A shows a flowchart illustrating an example process 1000 for wireless communication that supports multistatic radar measurements according to some implementations. In some implementations, the process 1000 may be performed by a wireless communication device operating as or within a radar receiver such as the STA 104, STA 604, radar receiver 720, or any of the radar receivers RRX1 or RRX2 of FIGS. 1, 6A, 7, and 8, respectively.

In some implementations, the process 1000 begins in block 1001 with receiving a radar alert frame carrying timing information indicating a timing relationship between a codeword sequence and one or more pulses. The radar alert frame may be received from a transmitting device. In some implementations, the one or more pulses may include a sequence of pulses and the timing information may indicate a duration of each of the one or more pulses and a delay between the detected codeword and the beginning of the sequence of pulses. In some implementations, the radar alert frame may be a CTS-to-self frame having a control trailer that carries the timing information.

In block 1002, the process 1000 proceeds with detecting a codeword of the codeword sequence. In some implementations, the detecting of the codeword may include tuning a plurality of antennas of the wireless communication device in a direction of a transmitting device. In some implementations, each codeword of the codeword sequence may include a respective Golay sequence. In block 1003, the process 1000 proceeds with determining a first time at which the codeword is detected.

In block 1004, the process 1000 proceeds with detecting an echo of a pulse of the one or more pulses. In some implementations, the detecting of the echo may include positioning a plurality of antennas of the wireless communication device in a plurality of directions. In block 1005, the process 1000 proceeds with determining a second time at which the echo is detected.

In block 1006, the process 1000 proceeds with determining a distance of an object to the wireless communication device based at least in part on the first time, the second time, and the timing information. In some implementations, the process 1000 may further proceed by transmitting feedback to a transmitting device responsive to detecting the echo, where the feedback indicates the second time.

Figure 10B:
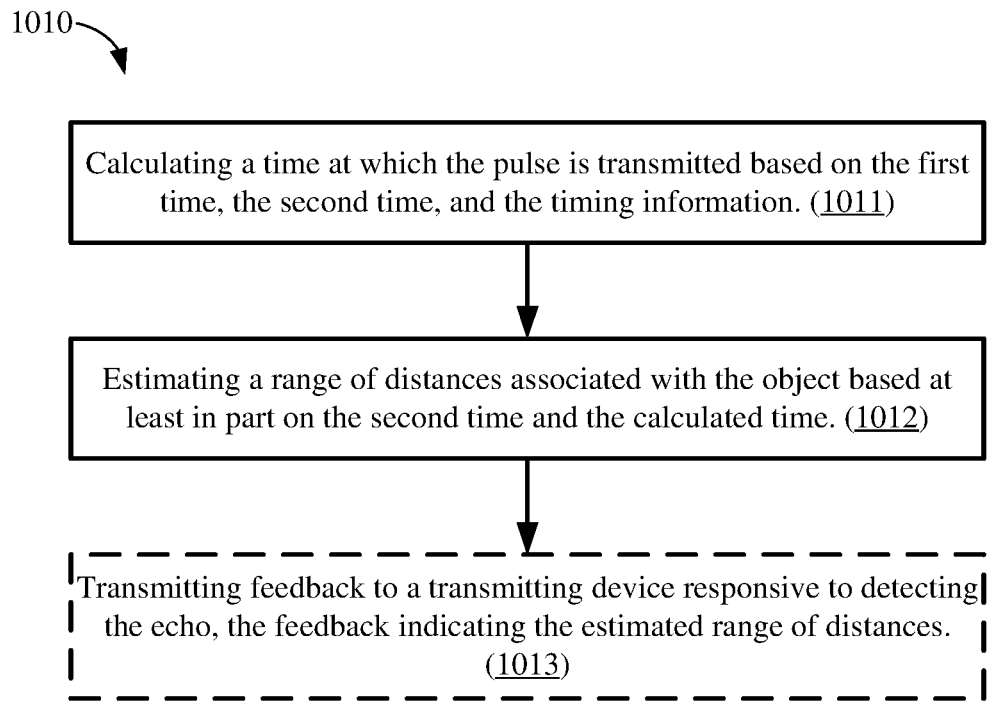
FIG. 10B shows a flowchart illustrating an example process for wireless communication that supports multistatic radar measurements according to some implementations.

FIG. 10B shows a flowchart illustrating an example process 1010 for wireless communication that supports multistatic radar measurements according to some implementations. In some implementations, the process 1010 may be performed by a wireless communication device operating as or within a radar receiver such as the STA 104, STA 604, radar receiver 720, or any of the radar receivers RRX1 or RRX2 of FIGS. 1, 6A, 7, and 8, respectively.

With reference for example to FIG. 10A, the process 1010 may begin, in block 1011, after the determination of the second time in block 1005. In block 1011, the process 1010 begins by calculating a time at which the pulse is transmitted based on the first time, the second time, and the timing information. In block 1012, the process 1010 proceeds with estimating a range of distances associated with the object based at least in part on the second time and the calculated time. In some implementations, the process 1010 may further proceed, in block 1013, with transmitting feedback to a transmitting device responsive to detecting the echo, where the feedback indicates the estimated range of distances.

Figure 10C:
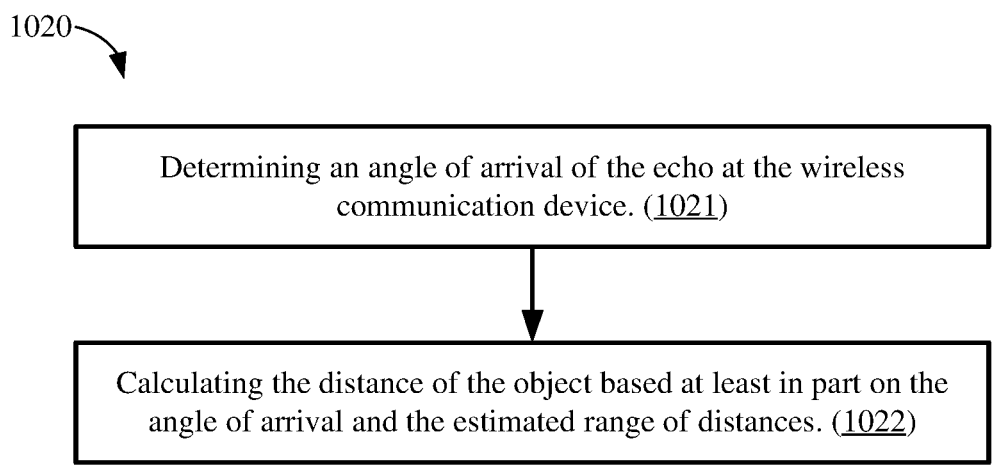
FIG. 10C shows a flowchart illustrating an example process for wireless communication that supports multistatic radar measurements according to some implementations.

FIG. 10C shows a flowchart illustrating an example process 1020 for wireless communication that supports multistatic radar measurements according to some implementations. In some implementations, the process 1020 may be performed by a wireless communication device operating as or within a radar receiver such as the STA 104, STA 604, radar receiver 720, or any of the radar receivers RRX1 or RRX2 of FIGS. 1, 6A, 7, and 8, respectively.

With reference for example to FIG. 10A, the process 1020 may be a more detailed implementation of the distance determination operation described in block 1006 of the process 1000. In some implementations, the process 1020 begins after the process 1010 of FIG. 10A. For example, the process 1020 may begin, in block 1021, after the estimation of the range of distances in block 1012 of the process 1010. In block 1021, the process 1020 begins by determining an angle of arrival of the echo at the wireless communication device. In block 1022, the process 1020 proceeds with calculating the distance of the object based at least in part on the angle of arrive and the estimated range of distances.

Figure 11A:
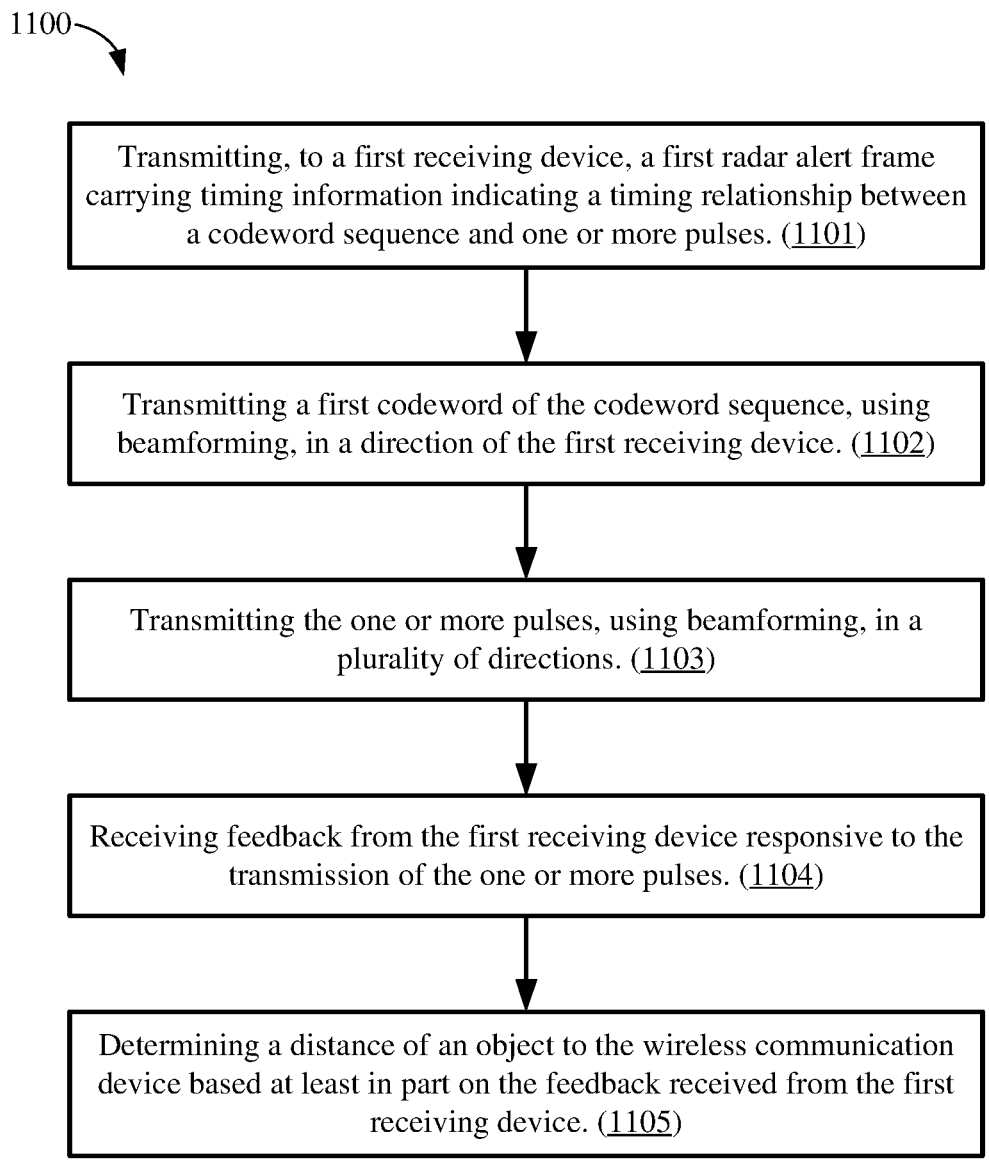
FIG. 11A shows a flowchart illustrating an example process for wireless communication that supports multistatic radar measurements according to some implementations.

FIG. 11A shows a flowchart illustrating an example process 1100 for wireless communication that supports multistatic radar measurements according to some implementations. In some implementations, the process 1100 may be performed by a wireless communication device operating as or within a radar transmitter such as the AP 102, AP 104, radar transmitter 710, or radar transmitter RTX of FIGS. 1, 6A, 7, and 8, respectively.

In some implementations, the process 1100 begins in block 1101 with transmitting, to a first receiving device, a first radar alert frame carrying timing information indicating a timing relationship between a codeword sequence and one or more pulses. In some implementations, the one or more pulses may include a sequence of pulses and the timing information may indicate a duration of each of the one or more pulses and a delay between transmission of the codeword sequence and the beginning of the sequence of pulses. In some implementations, the first radar alert frame may be a CTS-to-self frame having a control trailer that carries the timing information. In some implementations, the CTS-to-self frame may be transmitting, using beamforming, in a direction of the first receiving device.

In block 1102, the process 1100 proceeds with transmitting a first codeword of the codeword sequence, using beamforming, in a direction of the first receiving device. In block 1103, the process 1100 proceeds with transmitting the one or more pulses, using beamforming, in a plurality of directions. In some implementations, the codeword sequence and the one or more pulses may be transmitted in a PPDU including a PHY preamble and header. In block 1104, the process 1100 proceeds with receiving feedback from the first receiving device responsive to the transmission of the one or more pulses. In block 1105, the process 1100 proceeds with determining a distance of an object to the wireless communication device based at least in part on the feedback received from the first receiving device.

FIG. 11B shows a flowchart illustrating an example process 1110 for wireless communication that supports multistatic radar measurements according to some implementations. In some implementations, the process 1110 may be performed by a wireless communication device operating as or within a radar transmitter such as the AP 102, AP 104, radar transmitter 710, or radar transmitter RTX of FIGS. 1, 6A, 7, and 8, respectively.

With reference for example to FIG. 11A, the process 1110 may be a more detailed implementation of the distance determination operation described in block 1105 of the process 1100. For example, the process 1110 may begin, in block 1111, after the reception of the feedback from the first receiving device in block 1104. In block 1111, the process 1110 begins by determining, based on the feedback, a time at which an echo of a first pulse of the one or more pulses is detected by the first receiving device. In block 1112, the process 1110 proceeds with determining an angle of departure of the first pulse at the wireless communication device. In block 1113, the process 1110 proceeds with calculating the distance of the object based at least in part on the angle of departure, the time at which the echo is detected by the first receiving device, and a time at which the first pulse is transmitted by the wireless communication device.

FIG. 11C shows a flowchart illustrating an example process 1120 for wireless communication that supports multistatic radar measurements according to some implementations. In some implementations, the process 1120 may be performed by a wireless communication device operating as or within a radar transmitter such as the AP 102, AP 104, radar transmitter 710, or radar transmitter RTX of FIGS. 1, 6A, 7, and 8, respectively.

In some implementations, the process 1120 begins after the process 1100 of FIG. 11A. For example, the process 1120 may begin, in block 1121, after the determination of the distance of the object in block 1105. In block 1121, the process 1120 begins by transmitting a second radar frame carrying the timing information to a second receiving device. In block 1122, the process 1120 proceeds with transmitting a second codeword of the codeword sequence, using beamforming, in a direction of the second receiving device. In block 1123, the process 1120 proceeds with receiving feedback from the second receiving responsive to the transmission of the one or more pulses.

FIG. 11D shows a flowchart illustrating an example process 1130 for wireless communication that supports multistatic radar measurements according to some implementations. In some implementations, the process 1130 may be performed by a wireless communication device operating as or within a radar transmitter such as the AP 102, AP 104, radar transmitter 710, or radar transmitter RTX of FIGS. 1, 6A, 7, and 8, respectively.

With reference for example to FIG. 11A, the process 1130 may be a more detailed implementation of the distance determination operation described in block 1105 of the process 1100. In some implementations, the process 1130 begins after the process 1120 of FIG. 11C. For example, the process 1130 may begin, in block 1131, after the reception of feedback from the second receiving device in block 1123 of the process 1120. In block 1131, the process 1130 begins by determining, based on the feedback received from the first receiving device, a time at which an echo of a first pulse of the one or more pulses is detected by the first receiving device. In block 1132, the process 1130 proceeds with determining, based on the feedback received from the second receiving device, a time at which an echo of a second pulse of the one or more pulses is detected by the second receiving device, where the distance of the object is determined based on the time at which the echo of the first pulse is detected by the first receiving device and the time at which the echo of the second pulse is detected by the second receiving device.

Figure 12:
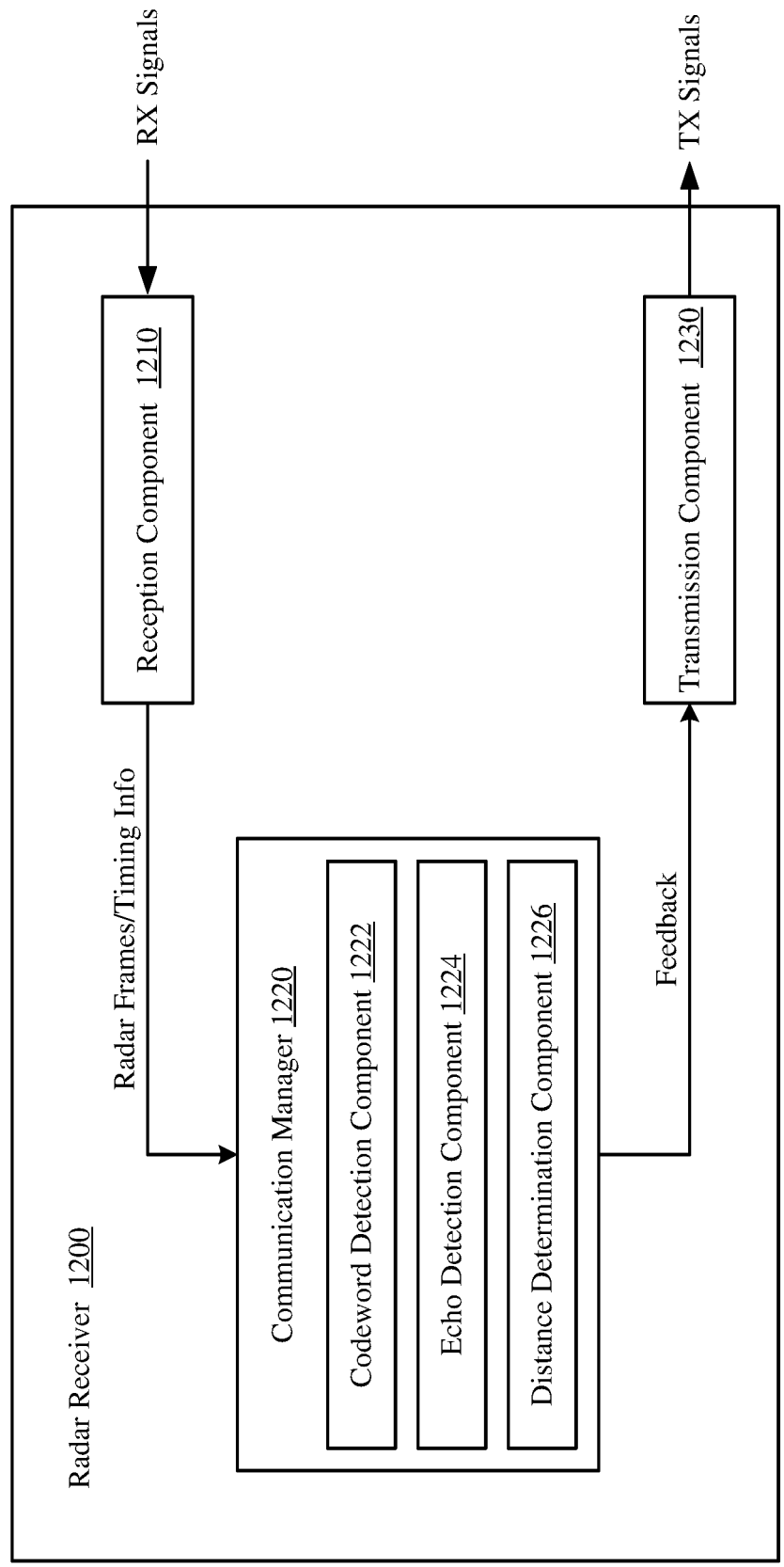
FIG. 12 shows a block diagram of an example radar receiver according to some implementations.

FIG. 12 shows a block diagram of an example radar receiver 1200 according to some implementations. In some implementations, the radar receiver 1200 may be configured to perform any of the processes 1000-1020 described above with reference to FIGS. 10A-10C, respectively. The radar receiver 1200 can be an example implementation of the wireless communication device 500. For example, the radar receiver 1200 can be a chip, SoC, chipset, package or device that includes at least one processor and at least one modem (for example, a Wi-Fi (IEEE 802.11) modem or a cellular modem).

The radar receiver 1200 includes a reception component 1210, a communication manager 1220, and a transmission component 1230. The communication manager 1220 further includes a codeword detection component 1222, an echo detection component 1224, and a distance determination component 1226. Portions of one or more of the components 1222-1226 may be implemented at least in part in hardware or firmware. In some implementations, at least some of the components 1222, 1224, or 1226 are implemented at least in part as software stored in a memory (such as the memory 508). For example, portions of one or more of the components 1222, 1224, and 1226 can be implemented as non-transitory instructions (or "code") executable by a processor (such as the processor 506) to perform the functions or operations of the respective component.

The reception component 1210 is configured to receive RX signals from a radar transmitter. In some implementations, the reception component 1210 may receive timing information indicating a timing relationship between a codeword sequence and one or more pulses. For example, the reception component 1210 may receive the timing information from the radar transmitter. The communication manager 1220 is configured to manage radar communications with the radar transmitter. In some implementations, the codeword detection component 1222 may detect a codeword of the codeword sequence and determine a first time at which the codeword is detected; the echo detection component 1224 may detect an echo of a pulse of the one or more pulses and determine a second time at which the echo is detected; and the distance determination component 1226 may determine a distance of an object to the wireless communication device based at least in part on the first time, the second time, and the timing information. The transmission component 1230 is configured to transmit TX signals to the radar transmitter. In some implementations, the transmission component 1230 may transmit feedback to the radar transmitter based on the detected echo.

Figure 13:
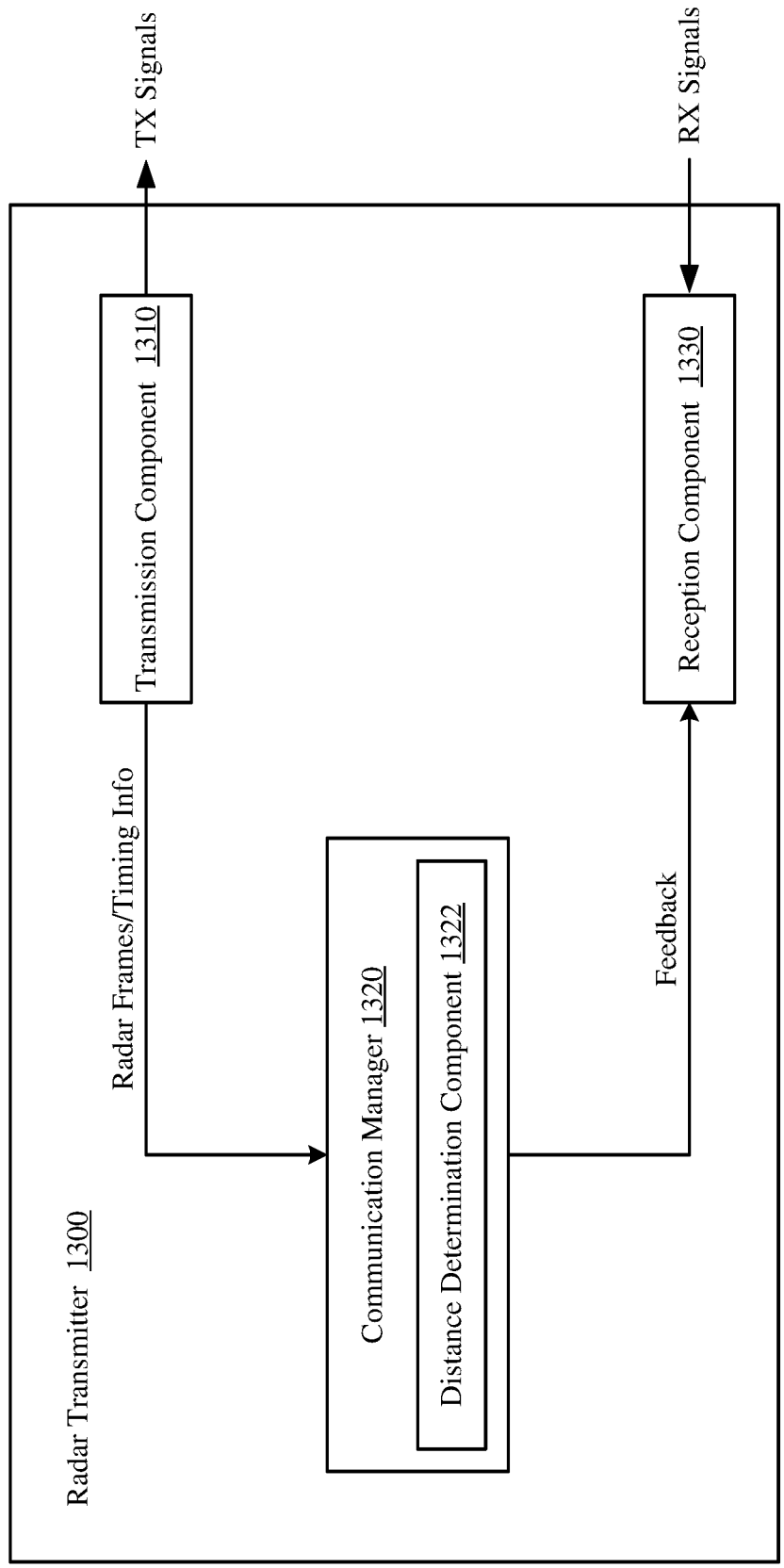
FIG. 13 shows a block diagram of an example radar transmitter according to some implementations.

FIG. 13 shows a block diagram of an example radar transmitter 1300 according to some implementations. In some implementations, the radar transmitter 1300 may be configured to perform any of the processes 1100-1130 described above with reference to FIGS. 11A-11D, respectively. The radar transmitter 1300 can be an example implementation of the wireless communication device 500 of FIG. 5. For example, the radar transmitter 1300 can be a chip, SoC, chipset, package or device that includes at least one processor and at least one modem (for example, a Wi-Fi (IEEE 802.11) modem or a cellular modem).

The radar transmitter 1300 includes a transmission component 1310, a communication manager 1320, and a reception component 1330. The communication manager 1320 further includes a distance determination component 1322. Portions of the distance determination component 1322 may be implemented at least in part in hardware or firmware. In some implementations, the distance determination component 1322 is implemented at least in part as software stored in a memory (such as the memory 508). For example, portions of the distance determination component 1322 can be implemented as non-transitory instructions (or "code") executable by a processor (such as the processor 506) to perform the functions or operations of the respective component.

The transmission component 1310 is configured to transmit TX signals to one or more radar receivers. In some implementations, the transmission component 1310 may transmit, to a first radar receiver, a radar alert frame carrying timing information indicating a timing relationship between a codeword sequence and one or more pulses. The transmission component 1310 may further transmit a first codeword of the codeword sequence, using beamforming, in a direction of the first radar receiver. The transmission component 1310 may further transmit the one or more pulses, using beamforming, in a plurality of directions. The reception component 1330 is configured to receive RX signals from the one or more radar receivers. In some implementations, the reception component 1330 may receive feedback from the first radar receiver responsive to the transmission of the one or more pulses. The communication manager 1320 is configured to manage radar communications with the receiving device. In some implementations, the distance determination component 1322 may determine a distance of an object to the radar transmitter 1300 based at least in part on the feedback received from the first radar receiver.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Implementation examples are described in the following numbered clauses:

1. A method for wireless communication performed by a wireless communication device, including:
receiving a radar alert frame carrying timing information indicating a timing relationship between a codeword sequence and one or more pulses;
detecting a codeword of the codeword sequence;
determining a first time at which the codeword is detected;
detecting an echo of a pulse of the one or more pulses;
determining a second time at which the echo is detected; and
determining a distance of an object to the wireless communication device based at least in part on the first time, the second time, and the timing information.

2. The method of clause 1, where the detecting of the codeword includes:
tuning a plurality of antennas of the wireless communication device in a direction of a transmitting device.

3. The method of any of clauses 1 or 2, where the detecting of the echo includes:
positioning a plurality of antennas of the wireless communication device in a plurality of directions.

4. The method of any of clauses 1-3, where the one or more pulses includes a sequence of pulses and the timing information indicates a duration of each of the one or more pulses and a delay between the detected codeword and the beginning of the sequence of pulses.

5. The method of any of clauses 1-4, further including:
transmitting feedback to a transmitting device responsive to detecting the echo, the feedback indicating the second time.

6. The method of any of clauses 1-5, further including:
calculating a time at which the pulse is transmitted based on the first time, the second time, and the timing information; and estimating a range of distances associated with the object based at least in part on the second time and the calculated time.

7. The method of any of clauses 1-6, further including:
transmitting feedback to a transmitting device responsive to detecting the echo, the feedback indicating the estimated range of distances.

8. The method of any of clauses 1-7, where the determining of the distance of the object further includes:
determining an angle of arrival of the echo at the wireless communication device; and
calculating the distance of the object based at least in part on the angle of arrival and the estimated range of distances.

9. The method of any of clauses 1-8, where each codeword of the codeword sequence includes a respective Golay sequence.

10. The method of any of clauses 1-9, where the radar alert frame is a clear-to-send (CTS)-to-self frame having a control trailer that carries the timing information.

11. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-10.

12. A method for wireless communication performed by a wireless communication device, including:
transmitting, to a first receiving device, a first radar alert frame carrying timing information indicating a timing relationship between a codeword sequence and one or more pulses;
transmitting a first codeword of the codeword sequence, using beamforming, in a direction of the first receiving device;
transmitting the one or more pulses, using beamforming, in a plurality of directions;
receiving feedback from the first receiving device responsive to the transmission of the one or more pulses; and
determining a distance of an object to the wireless communication device based at least in part on the feedback received from the first receiving device.

13. The method of clause 12, where the determining of the distance of the object includes:
determining, based on the feedback, a time at which an echo of a first pulse of the one or more pulses is detected by the first receiving device;
determining an angle of departure of the first pulse at the wireless communication device; and
calculating the distance of the object based at least in part on the angle of departure, the time at which the echo is detected by the first receiving device, and a time at which the first pulse is transmitted by the wireless communication device.

14. The method of any of clauses 12 or 13, where the one or more pulses includes a sequence of pulses and the timing information indicates a duration of each of the one or more pulses and a delay between the transmission of the codeword sequence and the beginning of the sequence of pulses.
15. The method of any of clauses 12 or 14, further including:
transmitting a second radar alert frame carrying the timing information to a second receiving device;
transmitting a second codeword of the codeword sequence, using beamforming, in a direction of the second receiving device; and
receiving feedback from the second receiving device responsive to the transmission of the one or more pulses.
16. The method of any of clauses 12, 14 or 15, where the determining of the distance of the object includes:
determining, based on the feedback received from the first receiving device, a time at which an echo of a first pulse of the one or more pulses is detected by the first receiving device; and
determining, based on the feedback received from the second receiving device, a time at which an echo of a second pulse of the one or more pulses is detected by the second receiving device, the distance of the object being determined based on the time at which the echo of the first pulse is detected by the first receiving device and the time at which the echo of the second pulse is detected by the second receiving device.
17. The method of any of clauses 12 or 14-16, where the feedback received from the first receiving device indicates a first range of distances associated with the object and the feedback received from the second receiving device indicates a second range of distances associated with the object.
18. The method of any of clauses 12-17, where each codeword of the codeword sequence includes a respective Golay sequence.
19. The method of any of clauses 12-18, where the first radar alert frame is a clear-to-send (CTS)-to-self frame having a control trailer that carries the timing information.
20. The method of any of clauses 12-19, where the CTS-to-self frame is transmitted, using beamforming, in a direction of the first receiving device.
21. The method of any of clauses 12-20, where the codeword sequence and the one or more pulses are transmitted in a physical layer (PHY) convergence protocol (PLCP) protocol data unit (PPDU) including a PHY preamble and header.
22. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 12-21.

What is claimed is:
1. A method for wireless communications performable at a first wireless communication device, comprising:
receiving, from a second wireless communication device, a radar alert frame carrying timing information indicating a timing relationship between a codeword sequence and one or more pulses;
receiving, from the second wireless communication device, a codeword of the codeword sequence; at a first time;
receiving an echo of a pulse of the one or more pulses at a second time; and
determining a distance of an object to the first wireless communication device in accordance with the first time, the second time, and the timing information.
2. The method of claim 1, wherein the receiving the codeword comprises:
tuning a plurality of antennas of the first wireless communication device in a direction of the second wireless communication device.
3. The method of claim 1, wherein the receiving the echo comprises:
positioning a plurality of antennas of the first wireless communication device in a plurality of directions.
4. The method of claim 1, wherein the one or more pulses comprises a sequence of pulses and the timing information indicates a duration of each of the one or more pulses and a delay between the codeword and a beginning of the sequence of pulses.
5. The method of claim 1, further comprising:
transmitting feedback to the second wireless communication device responsive to detecting the echo, the feedback indicating the second time.
6. The method of claim 1, further comprising:
calculating a time at which the pulse is transmitted in accordance with the first time, the second time, and the timing information; and
estimating a range of distances associated with the object in accordance with the second time and the calculated time.
7. The method of claim 6, further comprising:
transmitting feedback to the second wireless communication device responsive to detecting the echo, the feedback indicating the estimated range of distances.
8. The method of claim 6, wherein the determining of the distance of the object further comprises:
determining an angle of arrival of the echo at the first wireless communication device; and
calculating the distance of the object in accordance with the angle of arrival and the estimated range of distances.
9. The method of claim 1, wherein each codeword of the codeword sequence comprises a respective Golay sequence.
10. The method of claim 1, wherein the radar alert frame is a clear-to-send (CTS)-to-self frame having a control trailer that carries the timing information.
11. A first wireless communication device comprising:
at least one memory; and
at least one processor communicatively coupled with the at least one memory, the at least one processor operable to cause the first wireless communication device to:
receive, from a second wireless communication device, a radar alert frame carrying timing information indicating a timing relationship between a codeword sequence and one or more pulses;
receive, from the second wireless communication device, a codeword of the codeword sequence at a first time;
receive an echo of a pulse of the one or more pulses at second time; and
determine a distance of an object to the first wireless communication device in accordance with the first time, the second time, and the timing information.
12. The first wireless communication device of claim 11, wherein the at least one processor is further operable to cause the first wireless communication device to:

transmit feedback to the second wireless communication device responsive to detecting the echo, the feedback indicating the second time.

13. The first wireless communication device of claim 11, wherein the at least one processor is further operable to cause the first wireless communication device to:
calculate a time at which the pulse is transmitted in accordance with the first time, the second time, and the timing information; and
estimate a range of distances associated with the object in accordance with the second time and the calculated time.

14. The first wireless communication device of claim 13, wherein the at least one processor is further operable to cause the first wireless communication device to:
transmit feedback to the second wireless communication device responsive to detecting the echo, the feedback indicating the estimated range of distances.

15. The first wireless communication device of claim 13, wherein the determining of the distance of the object further comprises:
determining an angle of arrival of the echo at the first wireless communication device; and
calculating the distance of the object in accordance with the angle of arrival and the estimated range of distances.

16. A method for wireless communication performable at a wireless communication device, comprising:
transmitting, to a first receiving device, a first radar alert frame carrying timing information indicating a timing relationship between a codeword sequence and one or more pulses;
transmitting a first codeword of the codeword sequence, using beamforming, in a direction of the first receiving device;
transmitting the one or more pulses, using beamforming, in a plurality of directions;
receiving feedback from the first receiving device responsive to the transmission of the one or more pulses; and
determining a distance of an object to the wireless communication device in accordance with the feedback received from the first receiving device.

17. The method of claim 16, wherein the determining of the distance of the object comprises:
determining, based on the feedback, a time at which an echo of a first pulse of the one or more pulses is detected by the first receiving device;
determining an angle of departure of the first pulse at the wireless communication device; and
calculating the distance of the object in accordance with the angle of departure, the time at which the echo is detected by the first receiving device, and a time at which the first pulse is transmitted by the wireless communication device.

18. The method of claim 16, wherein the one or more pulses comprises a sequence of pulses and the timing information indicates a duration of each of the one or more pulses and a delay between the transmission of the codeword sequence and a beginning of the sequence of pulses.

19. The method of claim 16, further comprising:
transmitting a second radar alert frame carrying the timing information to a second receiving device;
transmitting a second codeword of the codeword sequence, using beamforming, in a direction of the second receiving device; and
receiving feedback from the second receiving device responsive to the transmission of the one or more pulses.

20. The method of claim 19, wherein the determining of the distance of the object comprises:
determining, based on the feedback received from the first receiving device, a time at which an echo of a first pulse of the one or more pulses is detected by the first receiving device; and
determining, based on the feedback received from the second receiving device, a time at which an echo of a second pulse of the one or more pulses is detected by the second receiving device, the distance of the object being determined based on the time at which the echo of the first pulse is detected by the first receiving device and the time at which the echo of the second pulse is detected by the second receiving device.

21. The method of claim 20, wherein the feedback received from the first receiving device indicates a first range of distances associated with the object and the feedback received from the second receiving device indicates a second range of distances associated with the object.

22. The method of claim 16, wherein each codeword of the codeword sequence comprises a respective Golay sequence.

23. The method of claim 16, wherein the first radar alert frame is a clear-to-send (CTS)-to-self frame having a control trailer that carries the timing information.

24. The method of claim 23, wherein the CTS-to-self frame is transmitted, using beamforming, in a direction of the first receiving device.

25. The method of claim 16, wherein the codeword sequence and the one or more pulses are transmitted in a physical layer (PHY) convergence protocol (PLCP) protocol data unit (PPDU) including a PHY preamble and header.

26. A wireless communication device comprising:
at least one memory; and
at least one processor communicatively coupled with the at least one memory, the at least one processor operable to cause the wireless communication device to:
transmit, to a first receiving device, a first radar alert frame carrying timing information indicating a timing relationship between a codeword sequence and one or more pulses;
transmit a first codeword of the codeword sequence, using beamforming, in a direction of the first receiving device;
transmit the one or more pulses, using beamforming, in a plurality of directions;
receive feedback from the first receiving device responsive to the transmission of the one or more pulses; and
determine a distance of an object to the wireless communication device in accordance with the feedback received from the first receiving device.

27. The wireless communication device of claim 26, wherein the determining of the distance of the object comprises:
determining, based on the feedback, a time at which an echo of a first pulse of the one or more pulses is detected by the first receiving device;
determining an angle of departure of the first pulse at the wireless communication device; and
calculating the distance of the object in accordance with the angle of departure, the time at which the echo is detected by the first receiving device, and a time at which the first pulse is transmitted by the wireless communication device.

28. The wireless communication device of claim 26, wherein the at least one processor is further operable to cause the wireless communication device to:

transmit a second radar alert frame carrying the timing information to a second receiving device;

transmit a second codeword of the codeword sequence, using beamforming, in a direction of the second receiving device; and receive feedback from the second receiving device responsive to the transmission of the one or more pulses.

29. The wireless communication device of claim 28, wherein the determining of the distance of the object comprises:

determining, based on the feedback received from the first receiving device, a time at which an echo of a first pulse of the one or more pulses is detected by the first receiving device; and determining, based on the feedback received from the second receiving device, a time at which an echo of a second pulse of the one or more pulses is detected by the second receiving device, the distance of the object being determined based on the time at which the echo of the first pulse is detected by the first receiving device and the time at which the echo of the second pulse is detected by the second receiving device.

30. The wireless communication device of claim 28, wherein the feedback received from the first receiving device indicates a first range of distances associated with the object and the feedback received from the second receiving device indicates a second range of distances associated with the object.

* * * * *